United States Patent [19]

Stolov

[11] Patent Number: 5,617,152
[45] Date of Patent: Apr. 1, 1997

[54] PROJECTOR SYSTEM FOR VIDEO AND COMPUTER GENERATED INFORMATION

[75] Inventor: Adi Stolov, Herzliya, Israel

[73] Assignee: UNIC View Ltd., Herzliya, Israel

[21] Appl. No.: 262,624

[22] Filed: Jun. 20, 1994

Related U.S. Application Data

[63] Continuation-in-part of Ser. No. 178,024, Jan. 6, 1994.

[30] Foreign Application Priority Data

| Jun. 20, 1993 | [IL] | Israel | 106068 |
| Aug. 29, 1993 | [IL] | Israel | 106834 |
| Dec. 29, 1993 | [IL] | Israel | 108226 |
| May 20, 1994 | [IL] | Israel | 109710 |

[51] Int. Cl.$^6$ .............. H04N 9/31; H04N 5/74; G03B 21/22; G02F 1/1335
[52] U.S. Cl. .......... 348/761; 348/766; 348/786; 353/74; 353/81; 353/84; 353/98; 353/101; 359/546; 349/62
[58] Field of Search .......... 348/744, 761 OR, 348/766, 786, 790, 791; 353/50, 47, 77, 74, 81, 84, 98, 101; 345/32, 38, 50, 87, 88, 108, 109; 359/40, 49, 223, 225, 226, 546

[56] References Cited

U.S. PATENT DOCUMENTS

| 3,909,111 | 9/1975 | Meyerhofer | 350/117 |
| 3,996,051 | 12/1976 | Meyerhofer | 96/27 |
| 4,083,626 | 4/1978 | Miyahara | 350/117 |
| 4,135,784 | 1/1979 | Barrick | 350/122 |
| 4,172,219 | 10/1979 | Deml et al. | 219/121 |
| 4,237,475 | 12/1980 | Sekiguchi | 348/175 |
| 4,379,617 | 4/1983 | Fuankoshi et al. | 350/126 |
| 4,432,608 | 2/1984 | Grup | 350/128 |
| 4,439,027 | 3/1984 | Shioda et al. | 353/77 |
| 4,443,814 | 4/1984 | Mori et al. | 358/60 |
| 4,453,810 | 6/1984 | Curiel | 353/55 |
| 4,482,206 | 11/1984 | Van Breemen | 350/128 |
| 4,490,010 | 12/1984 | Honda et al. | 350/128 |
| 4,502,755 | 3/1985 | Mori et al. | 350/128 |
| 4,509,822 | 4/1985 | Clausen et al. | 350/128 |
| 4,512,631 | 4/1985 | Van Breemen | 350/128 |

(List continued on next page.)

FOREIGN PATENT DOCUMENTS

| 37730 | 1/1931 | France | 359/546 |
| 62-71920 | 4/1987 | Japan | 359/49 |
| 63-118125 | 5/1988 | Japan | 359/49 |
| 2157049 | 10/1985 | United Kingdom | 359/49 |

OTHER PUBLICATIONS

Patent Abstracts of Japan, vol. 15, No. 401 (E–1121) 11 Oct. 1991.
Patent Abstracts of Japan, vol. 11, No. 383 (P–646) 15 Dec. 1987.
Patent Abstracts of Japan, vol. 15, No. 455 (P–1277) 19 Nov. 1991.
Patent Abstracts of Japan, vol. 17, No. 703 (P–1666) 22 Dec. 1993.
Patent Abstracts of Japan, vol. 12, No. 377 (P–768) 7 Oct. 1988.
Patent Abstracts of Japan, vol. 16, No. 197 (P–197) 12 May 1992.
Patent Abstracts of Japan, vol. 17, No. 390 (P–1577) 21 Jul. 1993.

*Primary Examiner*—Victor R. Kostak
*Assistant Examiner*—John W. Miller
*Attorney, Agent, or Firm*—Abelman, Frayne & Schawb

[57] ABSTRACT

A projector for use with a light source and including a shutter assembly panel having a multiplicity of pixel light valves overlying an array of interspersed shutter pixels each of which transmits only one of a plurality of colors, and a color filter disposed intermediate the light source and the planar shutter and spaced therefrom and having an array of interspersed filter pixels, each of which only transmits only one of a plurality of colors, wherein the array of interspersed filter pixels is in light and color registration with the array of interspersed shutter pixels, such that generally light of a given color impinges on a shutter area of the same color.

11 Claims, 23 Drawing Sheets

U.S. PATENT DOCUMENTS

| | | | |
|---|---|---|---|
| 4,544,946 | 10/1985 | Van Breemen | 358/60 |
| 4,708,435 | 11/1987 | Yata et al. | 350/129 |
| 4,729,631 | 3/1988 | Takahashi et al. | 350/129 |
| 4,739,567 | 4/1988 | Cardin | 40/471 |
| 4,762,393 | 8/1988 | Gerritsen | 350/128 |
| 4,895,429 | 1/1990 | Iwahara et al. | 350/124 |
| 4,914,556 | 4/1990 | Richardson | 362/293 |
| 4,919,515 | 4/1990 | Hasegawa et al. | 350/128 |
| 4,921,329 | 5/1990 | Ito | 350/128 |
| 4,927,233 | 5/1990 | Nakanishi et al. | 350/128 |
| 4,931,859 | 6/1990 | Dillard et al. | 358/60 |
| 4,936,652 | 6/1990 | Clausen et al. | 350/128 |
| 4,941,732 | 7/1990 | Umeda et al. | 350/128 |
| 4,953,949 | 9/1990 | Dallas | 350/130 |
| 4,993,806 | 2/1991 | Clausen | 350/128 |
| 5,005,945 | 4/1991 | van den Ven | 350/128 |
| 5,013,132 | 5/1991 | Yokoo et al. | 350/128 |
| 5,048,949 | 9/1991 | Sato et al. | 353/77 |
| 5,056,912 | 10/1991 | Hamada et al. | 353/38 |
| 5,066,099 | 11/1991 | Yoshida et al. | 359/47 |
| 5,071,224 | 12/1991 | Yokoo | 359/456 |
| 5,074,644 | 12/1991 | Hirai | 359/455 |
| 5,076,661 | 12/1991 | Bradley | 359/456 |
| 5,105,263 | 4/1992 | Shioda | 348/756 |
| 5,121,252 | 6/1992 | Okada | 359/455 |
| 5,123,728 | 6/1992 | Gradin | 353/78 |
| 5,146,342 | 9/1992 | Yokoo | 358/231 |
| 5,146,365 | 9/1992 | Minoura et al. | 359/619 |
| 5,166,824 | 11/1992 | Nishiguchi et al. | 359/456 |
| 5,191,472 | 3/1993 | Kurematsu et al. | 359/619 |
| 5,200,854 | 5/1993 | Ogino et al. | 359/451 |
| 5,241,416 | 8/1993 | Mitsutake et al. | 359/456 |
| 5,246,941 | 11/1993 | Nakano et al. | 358/231 |
| 5,267,063 | 11/1993 | Ray | 359/49 |
| 5,381,187 | 1/1995 | Takamatsu et al. | 348/761 |

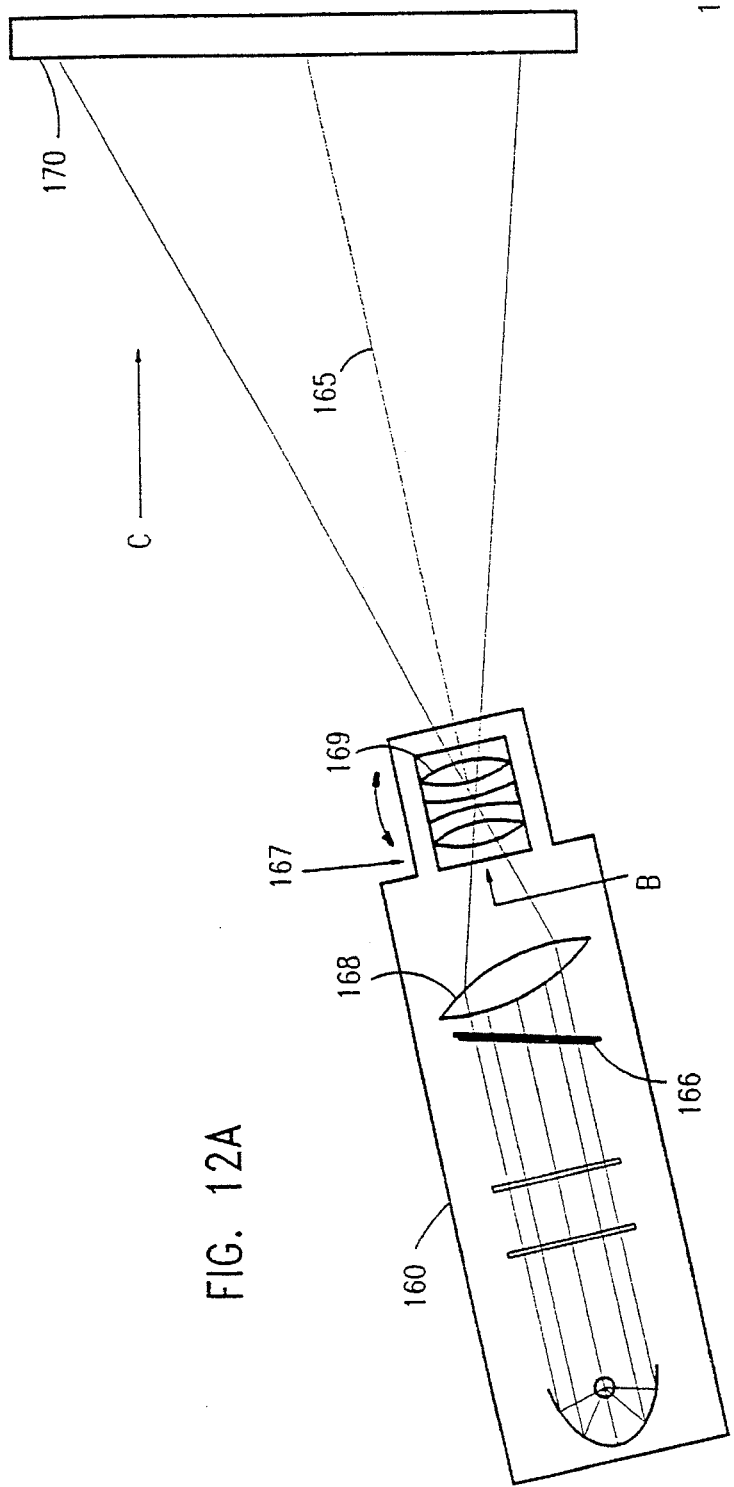
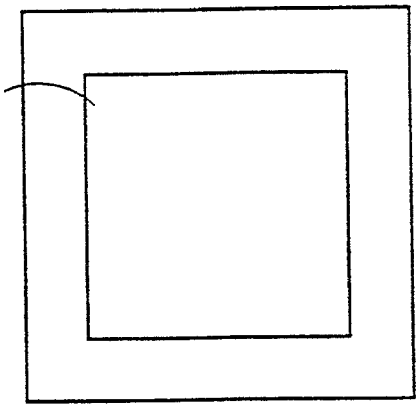
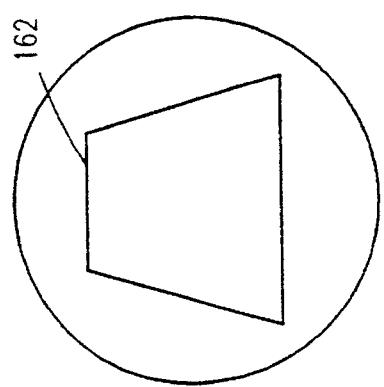
FIG. 12A
FIG. 12B
FIG. 12C

FIG. 18
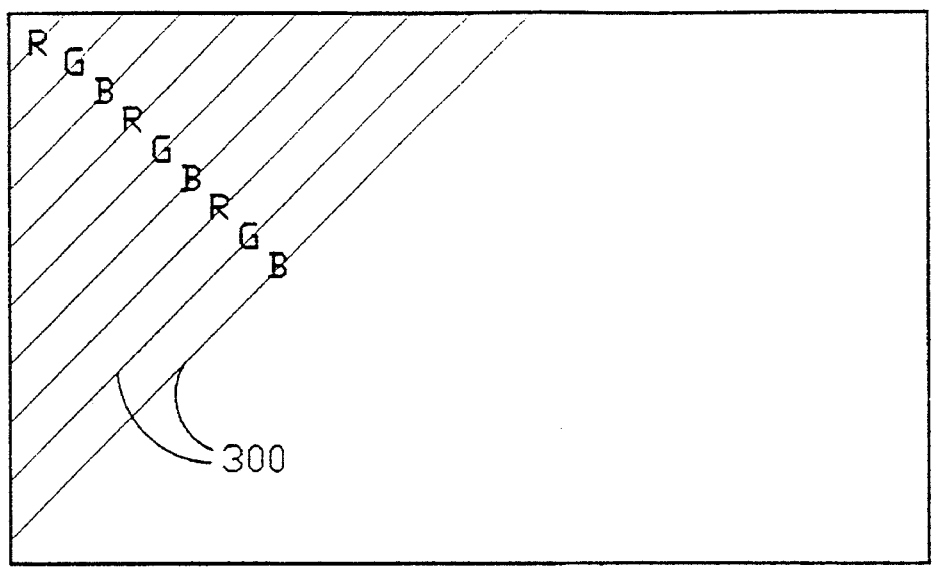
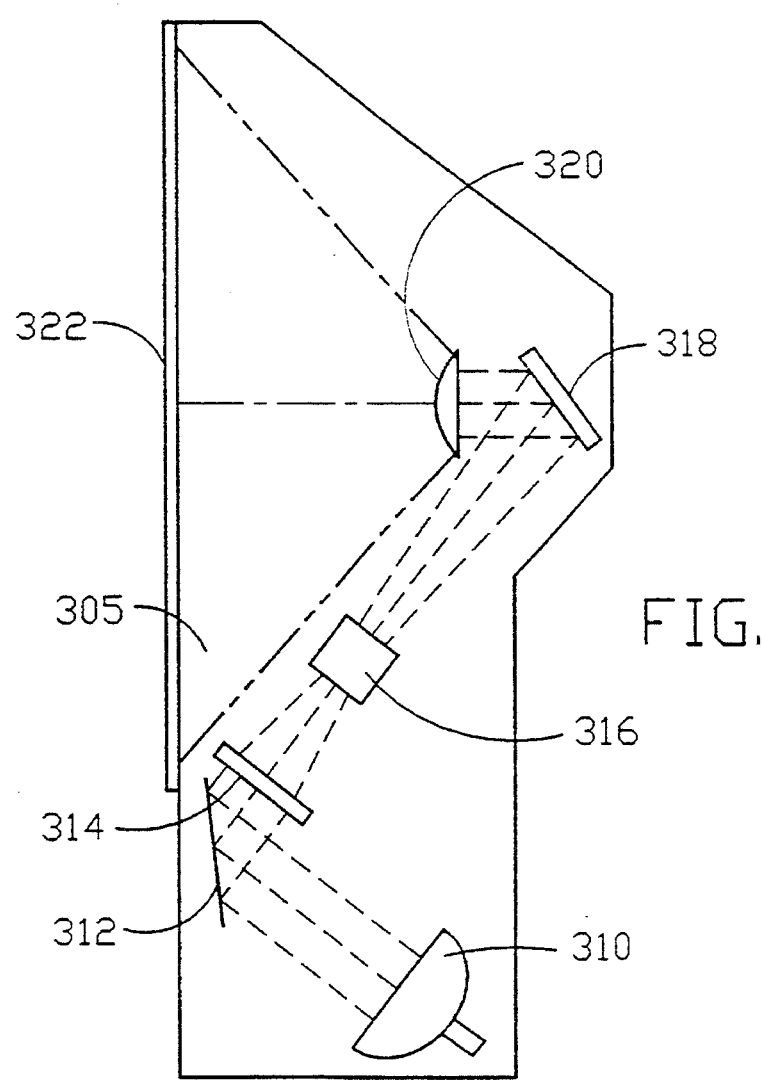
FIG. 19

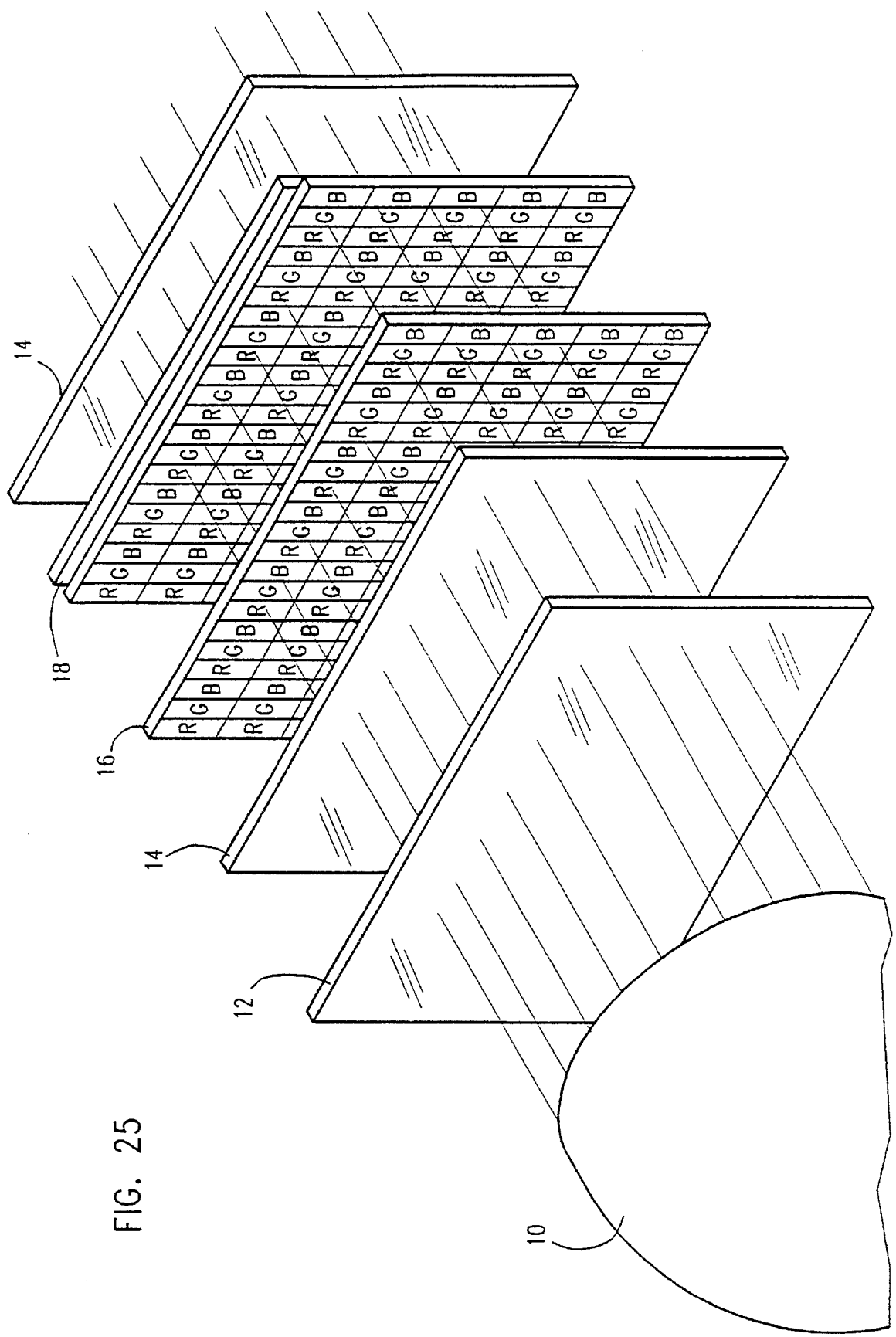

PROJECTOR SYSTEM FOR VIDEO AND COMPUTER GENERATED INFORMATION

This is a continuation-in-part of application Ser. No. 08/178,024, filed Jan. 6, 1994.

FIELD OF THE INVENTION

The present invention relates to visual projection and more particularly to video and computer generated information projectors and panels useful therewith.

BACKGROUND OF THE INVENTION

Various types of video and computer generated information projectors are known. These include, for example, the SharpVision product line commercially available from Sharp Corporation of Japan. Conventional projectors of this type have achieved significant market penetration but suffer from various disadvantages and limitations.

One of the significant limitations in liquid crystal panel projectors lies in the relatively limited amount of light that can be projected. It may be appreciated that the amount of light that can be transmitted through a conventional color liquid crystal panel assembly is limited by the amount of light that can be absorbed by the liquid crystal panel without degradation of its performance and permanent damage thereto inter alia due to overheating. Accordingly the brightness of projected images produced by such projectors is correspondingly limited.

Conventional displays also suffer from limitations in contrast due to their inability to suppress reflection of ambient light.

Various types of projection systems are known in the art for a wide range of applications using various types of light sources, both coherent and non-coherent. Projection systems which employ non-coherent light sources, such as incandescent or arc lamps, have been found by the applicants to display sometimes unacceptable variations in the intensity of light output produced thereby over a projection plane. Such variations may result, inter alia, from non-uniformities, asymmetries and imperfections in the glass envelope of the light source, as well as shadows produced by the light source filament or arc electrodes.

Halogen lamps, such as Model FLT produced by Thorn Lighting Ltd. of Great Britain, are formed with conditioned and segmented reflectors so as to direct light from multiple locations on the light source onto each location in a projection plane. While such a structure does reduce the intensity variation, the reduction is insufficient for certain high quality projection applications wherein the projection plane is relatively close to the light source.

SUMMARY OF THE INVENTION

The present invention seeks to provide an improved projector and projection system, and an improved reflector suitable for use therein.

There is thus provided in accordance with a preferred embodiment of the present invention a projector for use with a light source and including:

a shutter assembly having a multiplicity of pixel light valves; and a color separator disposed intermediate the light source and the shutter assembly and spaced therefrom and providing a plurality of spatially separated differently colored light beams;

wherein the plurality of spatially separated differently colored light beams are in predetermined registration with the multiplicity of pixel light valves.

Additionally in accordance with a preferred embodiment of the present invention there is provided a projection system including:

a projector for use with a light source and including:

a shutter assembly having a multiplicity of pixel light valves;

a color separator disposed intermediate the light source and the shutter assembly and providing a plurality of spatially separated differently colored light beams; and a screen arranged in light receiving relationship with the projector and including a plurality of light impingement regions having different color characteristics, and wherein the plurality of spatially separated differently colored light beams are in predetermined registration with the multiplicity of pixel light valves, and the plurality of spatially separated differently colored light beams are arranged in predetermined registration with the plurality of light impingement regions having different color characteristics.

In accordance with one embodiment of the present invention, the color separator includes a color filter array.

Preferably, the color separator includes an array of prism/lens combinations.

In accordance with an embodiment of the invention, the color separator includes a color filter array and an array of prism/lens combinations.

Preferably, the array of prism/lens combinations includes an array of cylindrical prism/cylindrical lens combinations.

Additionally in accordance with a preferred embodiment of the present invention there is provided a projector for use with a light source and including:

a shutter assembly having a multiplicity of pixel light valves; and a color separator including an array of prism/lens combinations disposed intermediate the light source and the shutter assembly and providing a plurality of spatially separated differently colored light beams;

wherein the plurality of spatially separated differently colored light beams are in predetermined registration with the multiplicity of pixel light valves.

Additionally in accordance with a preferred embodiment of the invention, the projector may also include an upstream selective light absorber disposed intermediate the light source and the shutter assembly and spaced therefrom.

Further in accordance with a preferred embodiment of the present invention there is provided a projector for use with a light source and including:

a shutter assembly having a multiplicity of pixel light valves; and an upstream selective light absorber disposed intermediate the light source and the shutter assembly and spaced therefrom.

The selective light absorber may be a polarizer and/or a color filter array.

Additionally in accordance with a preferred embodiment of the present invention, the projector also includes a downstream selective light absorber disposed downstream of the shutter assembly and spaced therefrom.

Preferably, the shutter assembly includes a liquid crystal display panel which may be a black and white liquid crystal display panel but could be a color liquid crystal display panel. When a commercially available liquid crystal display panel is used, the identical polarizers upstream and downstream of the liquid crystal may be separated and distanced therefrom. Alternatively, they may be left intact and an additional identical upstream polarizer may be provided in spaced relationship therewith to provide absorption and dissipation of heat.

Preferably, the projector also includes a source of collimated light or of noncollimated light.

Preferably, the apparatus of the present invention also includes a focussing lens assembly.

In accordance with one embodiment of the invention, the focussing lens assembly and the shutter assembly are tiltably mounted.

The apparatus of the present invention may be embodied as an overhead projection system, a rear projection system, a forward reflective projection system, an angled rear projection system or any other suitable type of system.

Further in accordance with a preferred embodiment of the present invention there is provided a projection screen including a plurality of differently colored light impingement regions. Preferably the differently colored light impingement regions include an array of differently colored stripes. The projection screen may be used with projectors of the type described above or alternatively as a projection screen with any type of projector wherein light of different colors appears at different locations on the screen.

Additionally in accordance with a preferred embodiment of the present invention there is provided a rear projection display device comprising:

a projector;

a light transmissive screen; and diverging optics interposed between the projector and the screen for directing light from the projector onto the screen.

In accordance with one embodiment of the invention, the projector is a television or video projector and the display device is a rear projection television.

The projector may be any suitable type of projector but preferably is a projector of any of the types described hereinabove.

The diverging optics may comprise a convex mirror, at least one diverging lens or a combination thereof.

There is further provided in accordance with a preferred embodiment of the present invention a projector for use with a light source and including a shutter assembly panel having a multiplicity of pixel light valves overlying an array of interspersed shutter pixels each of which transmits only one of a plurality of colors, and a color filter disposed intermediate the light source and the planar shutter and spaced therefrom and having an array of interspersed filter pixels, each of which only transmits only one of a plurality of colors, wherein the array of interspersed filter pixels is in light and color registration with the array of interspersed shutter pixels, such that generally light of a given color impinges on a shutter area of the same color.

Still further in accordance with a preferred embodiment of the present invention the projector also includes a light polarizer associated with the color filter.

Yet further in accordance with a preferred embodiment of the present invention the projector also includes a light polarizer disposed intermediate the light source and the shutter assembly panel for further absorbing energy which would otherwise be absorbed by the shutter assembly panel.

Additionally in accordance with a preferred embodiment of the present invention the light source includes a source of collimated light.

Also in accordance with a preferred embodiment of the present invention the array of interspersed shutter pixels and said array of interspersed filter pixels are coextensive.

Further in accordance with a preferred embodiment of the present invention the light source includes a source of non-collimated light.

Still further in accordance with a preferred embodiment of the present invention the array of interspersed shutter pixels and said array of interspersed filter pixels are non-coextensive.

Also in accordance with a preferred embodiment of the present invention there is also included a light transmissive UV & IR blocking filter which is interposed between the light source and the color filter.

Additionally in accordance with a preferred embodiment of the present invention the apparatus includes a focussing lens.

Further in accordance with a preferred embodiment of the present invention the shutter assembly panel includes a color liquid crystal shutter assembly panel.

There is provided in accordance with a preferred embodiment of the present invention a projector for use with a light source and including a polarizing shutter assembly panel having a multiplicity of pixel light valves, and a light polarizer disposed intermediate the light source and the shutter assembly panel and spaced therefrom for further absorbing energy which would otherwise be absorbed by the shutter assembly panel.

There is also provided in accordance with a preferred embodiment of the present invention a radiation reflector for providing generally homogeneous illumination in a plane perpendicular to an axis, the reflector including a generally curved reflecting surface formed of a multiplicity of flat surface units, the multiplicity of flat surface units being configured and arranged such that the projection of each of said multiplicity of flat surface units onto a plane perpendicular to said axis is generally identical.

Further in accordance with a preferred embodiment of the present invention there is provided a compact projection system including:

a non-homogeneous radiation source;

a radiation reflector for providing generally homogeneous non-imagewise illumination in a plane perpendicular to an axis, the reflector including a generally curved reflecting surface receiving radiation from the non-homogeneous radiation source, the reflecting surface being formed of a multiplicity of flat surface units, the multiplicity of flat surface units being configured and arranged such that the projection of each of said multiplicity of flat surface units onto a plane perpendicular to said axis is generally identical, the radiation reflector being arranged to illuminate a light transmissive object in the plane;

lens apparatus for receiving radiation passing through the light transmissive object and imagewise focusing the radiation; and a screen for receiving the focused radiation.

Preferably, the generally curved reflecting surface includes a concave surface and includes a surface of rotation.

In accordance with a preferred embodiment of the present invention, the generally curved reflecting surface includes a generally parabolic surface.

In accordance with a preferred embodiment of the present invention, the light transmissive object is located at a distance from the facing edge of the reflecting surface along the axis which is approximately equal to the largest dimension of the opening of the reflecting surface at the facing edge.

Preferably, the generally homogeneous non-imagewise illumination is directed generally axially along the axis.

In accordance with a preferred embodiment of the present invention, the maximum dimension of the light transmissive object in the plane is approximately equal to the distance of the plane from the light source.

BRIEF DESCRIPTION OF THE DRAWINGS

The present invention will be understood and appreciated more fully from the following detailed description, taken in conjunction with the drawings in which:

FIGS. 12A, 12B and 12C are respectively a simplified illustration of a projector, an illustration of the image as seen along arrow B and an illustration of an image projected thereby as seen along arrow C;

FIG. 18 is a schematic illustration of a projection screen constructed and operative in accordance with a preferred embodiment of the present invention;

FIGS. 19 and 20 are simplified illustrations of two alternative versions of a projection television system constructed and operative in accordance with a preferred embodiment of the present invention, the version of FIG. 20 being preferred over the version of FIG. 19;

FIG. 25 is a simplified illustration of the spaced registration of a color filter and a shutter assembly panel in the embodiment of FIG. 24A.

DETAILED DESCRIPTION OF PREFERRED EMBODIMENTS

Figure 1A:
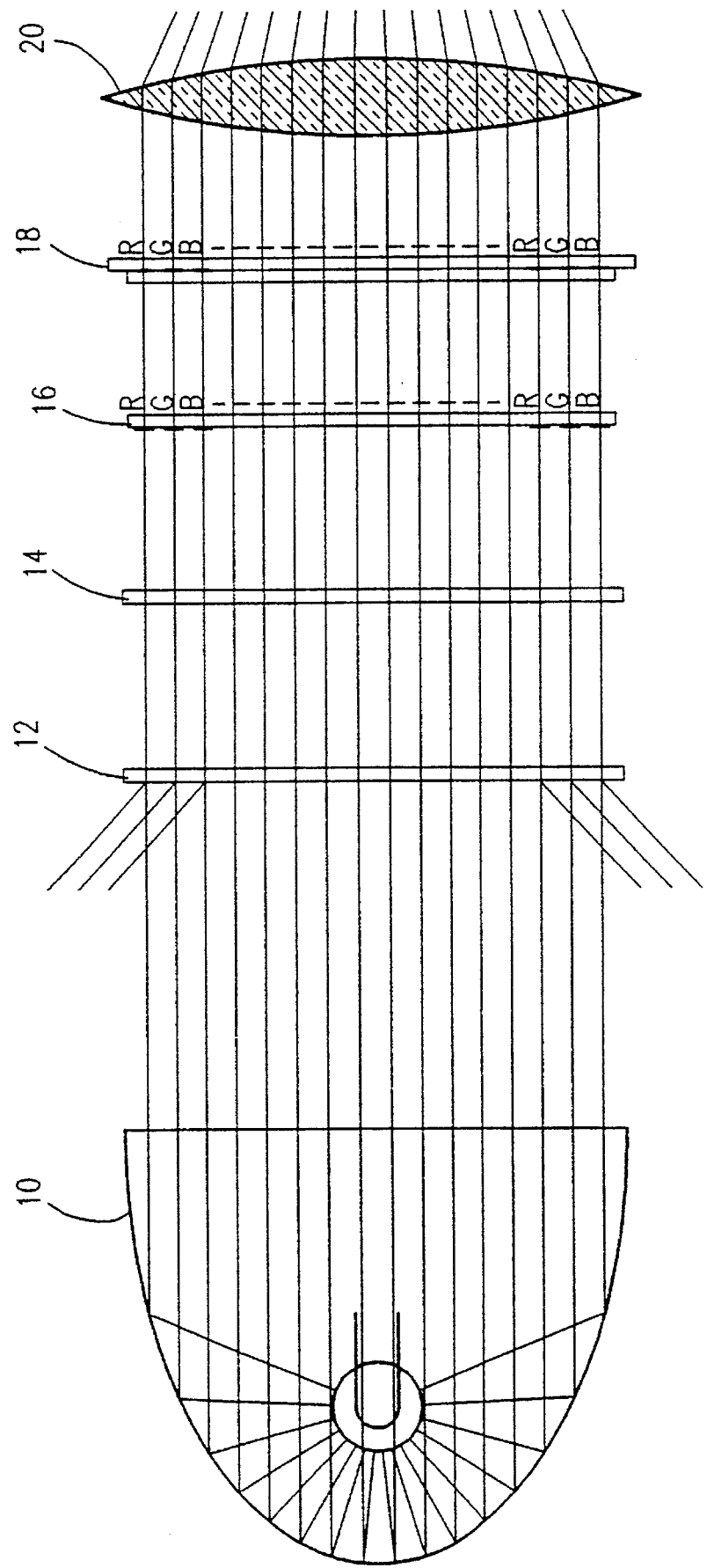
FIG. 1A is a simplified pictorial illustration of a projector constructed and operative in accordance with a preferred embodiment of the present invention.

Reference is now made to FIG. 1A, which illustrates one preferred embodiment of the invention, it being understood that the drawing of FIG. 1A and the remaining drawings herein are drawn not necessarily to scale for enhanced clarity and simplicity.

A collimated light source 10 of relatively high intensity, such as an arc lamp having a 1.2 Kilowatt rating, provides a collimated beam of light which impinges on a transparent UV & IR blocking filter 12, and then preferably, but optionally, passes through a polarizing plate 14.

The collimated light beam then preferably passes through a light separator, in this case a color filter 16 having a multiplicity of color transmissive pixels, of different colors. Preferably, the color filter 16 comprises an array of interspersed filter pixels, each of which transmits only one of a plurality of colors, such as the primary colors, red, green and blue.

The collimated light from the color filter then impinges on a shutter assembly panel 18, such as a liquid crystal shutter assembly panel, spaced from the color filter 16, which preferably comprises a multiplicity of electrically controlled pixel light valves, employing either active or passive matrices, overlying an array of interspersed shutter pixels each of which transmits only one of a plurality of colors, such as the primary colors red, green and blue. Alternatively any other suitable type of shutter assembly panel may be employed.

Figure 24A:
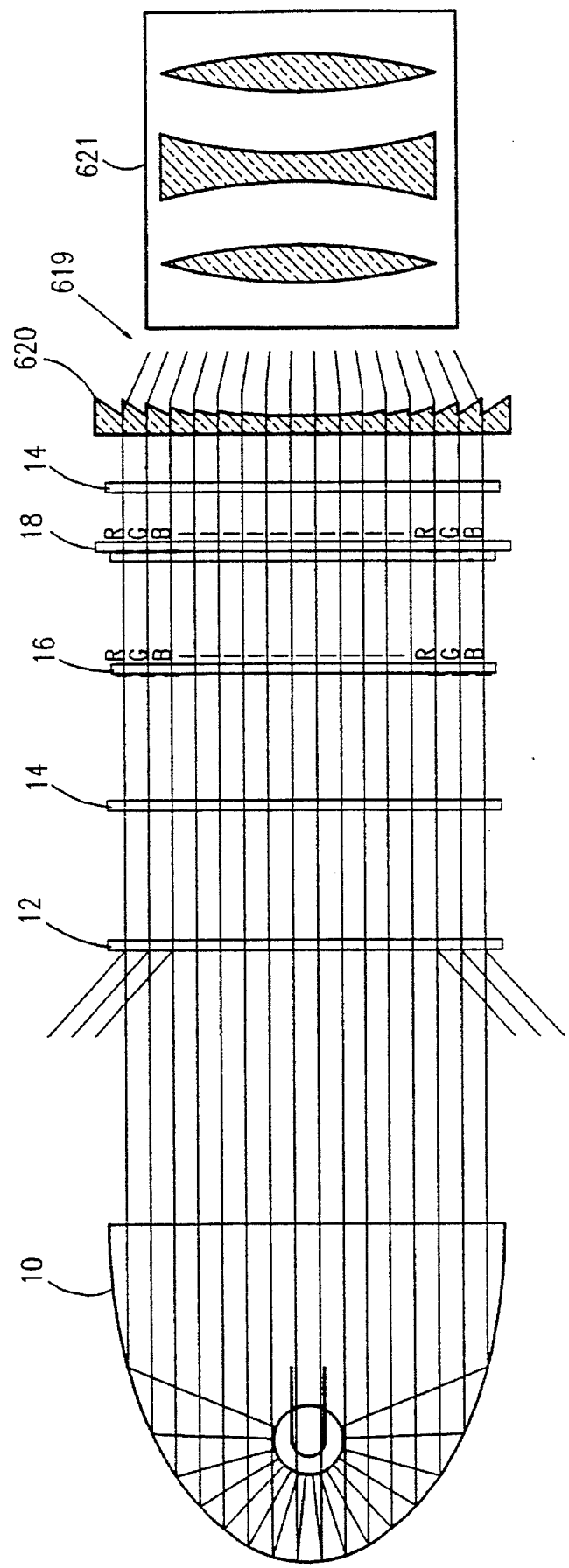
FIG. 24A is a simplified pictorial illustration of a projector constructed and operative in accordance with still a further preferred embodiment of the present invention.

When a liquid crystal shutter assembly panel is provided, identical polarizers must be provided upstream and downstream of the liquid crystal, as can be seen in the embodiment of FIG. 24A. The polarizer 14 is preferably spaced from the shutter assembly panel as shown in FIG. 24A, but alternatively or additionally may form part of the shutter assembly panel 18.

In accordance with a preferred embodiment of the invention, the array of interspersed filter pixels is in light and color registration with the array of interspersed shutter pixels, such that generally light of a given color impinges on a shutter area of the same color.

In the embodiment of FIG. 1A, where collimated light is used, the array of interspersed filter pixels is in one-to-one registration with the array of interspersed shutter pixels.

Light modulated by the shutter assembly panel 18 is focussed by a lens 20 downstream thereof or at any other suitable location.

Reference is now made to FIG. 24A which illustrates a further preferred embodiment of the projector of FIG. 1A. The projector of FIG. 24A is similar to the projector of FIG. 1A except in that light modulated by the shutter assembly panel 18, and passing through another polarizer plate 14, identical to the polarizer plate 14 upstream of filter 16, is focussed by a lens assembly 619 downstream thereof or at any other suitable location. Preferably, lens assembly 619 includes a Fresnel lens 620 and a compound lens 621.

Figure 1B:
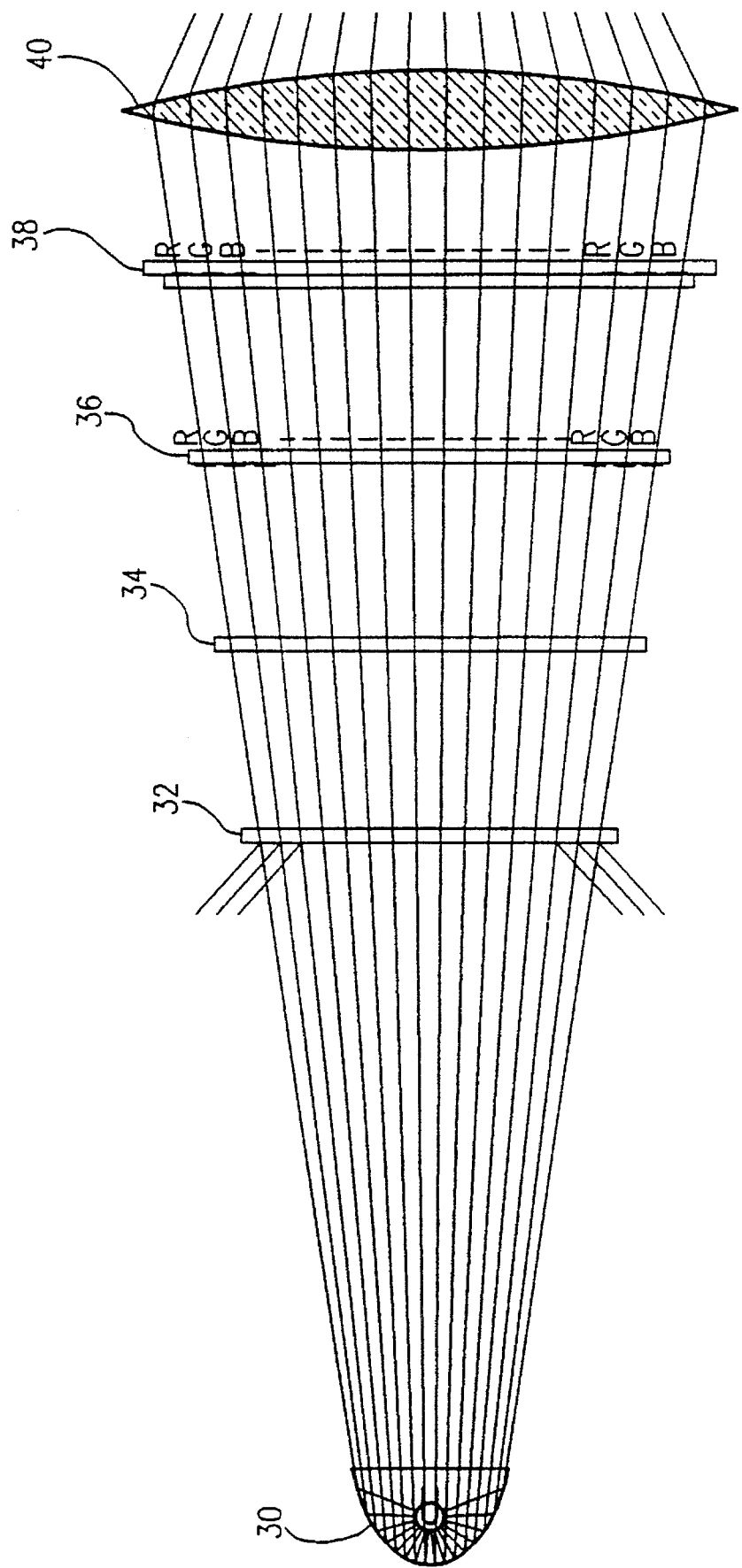
FIG. 1B is a simplified pictorial illustration of a projector constructed and operative in accordance with another preferred embodiment of the present invention.

Reference is now made to FIG. 1B which illustrates another preferred embodiment of the invention.

A non-collimated light source 30 of relatively high intensity provides a non-collimated beam of light which impinges on a transparent UV & IR blocking filter 32 and then preferably but optionally passes through a polarizing plate 34.

The non-collimated light beam preferably then passes through a light separator, such as a color filter 36, preferably spaced from the polarizing plate and having a multiplicity of color transmissive pixels, of different colors. Preferably, the color filter 36 comprises an array of interspersed filter pixels, each of which transmits only one of a plurality of colors, such as the primary colors, red, green and blue.

Figure 24B:
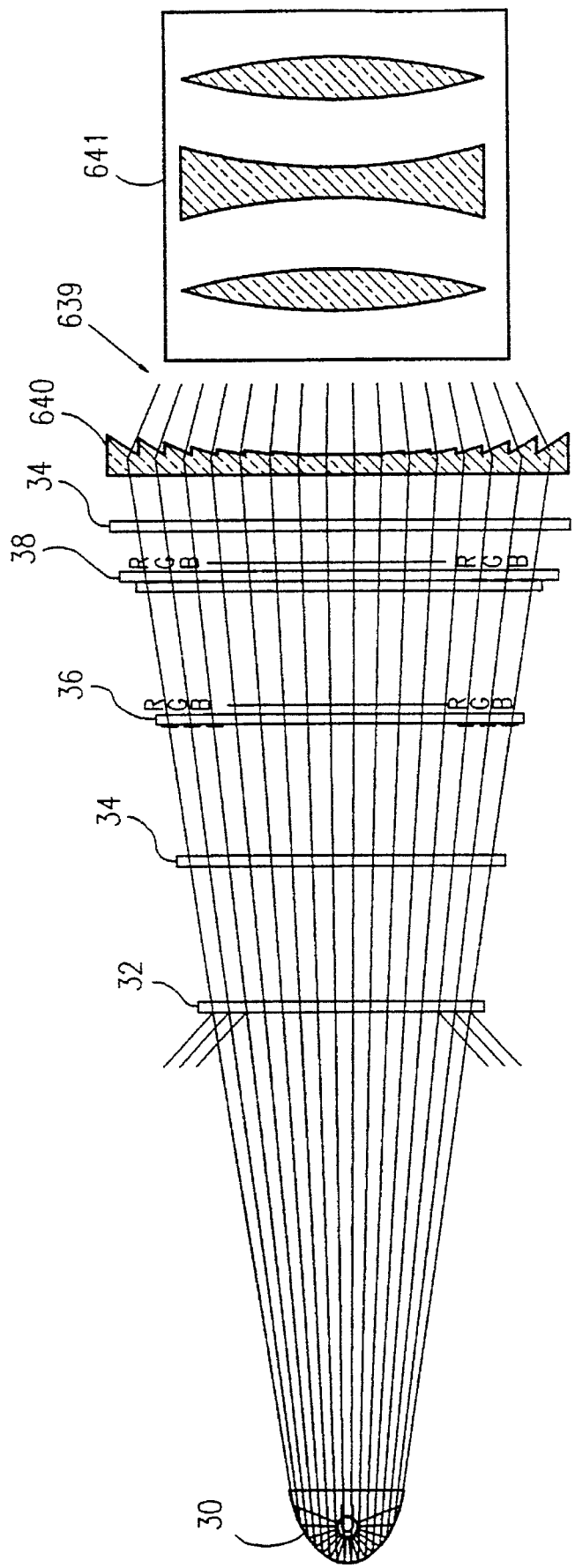
FIG. 24B is a simplified pictorial illustration of a projector constructed and operative in accordance with yet another preferred embodiment of the present invention.

The non-collimated light from the color filter then impinges on a shutter assembly panel 38, such as a liquid crystal shutter assembly panel, spaced from the color filter 36, which preferably comprises a multiplicity of electrically controlled pixel light valves overlying an array of interspersed shutter pixels each of which transmits only one of a plurality of colors, such as the primary colors red, green and blue. When a liquid crystal shutter assembly panel is provided, a polarizer must be provided, as can be seen in the embodiment of FIG. 24B. The polarizer 34 is preferably spaced from the shutter assembly panel as shown in FIG. 1B, but alternatively or additionally may form part of the shutter assembly panel 38.

In accordance with a preferred embodiment of the invention, the array of interspersed filter pixels is in light and color registration with the array of interspersed shutter pixels, such that generally light of a given color impinges on a shutter area of the same color.

In the embodiment of FIG. 1B, where non-collimated light is used, the array of interspersed filter pixels is not in one-to-one registration with the array of interspersed shutter pixels.

Light modulated by the shutter assembly panel 38 is focussed by a lens 40 downstream thereof.

Reference is now made to FIG. 24B, which illustrates a projector constructed and operative in accordance with yet another preferred embodiment of the present invention. The projector of FIG. 24B is similar to the projector of FIG. 1B except in that light modulated by the shutter assembly panel 38, and passing through another polarizer plate 34, identical to the polarizer plate 34 upstream of filter 36, is focussed by a lens assembly 639 downstream thereof or at any other suitable location. Preferably, lens assembly 639 includes a Fresnel lens 640 and a compound lens 641.

Figure 2A:
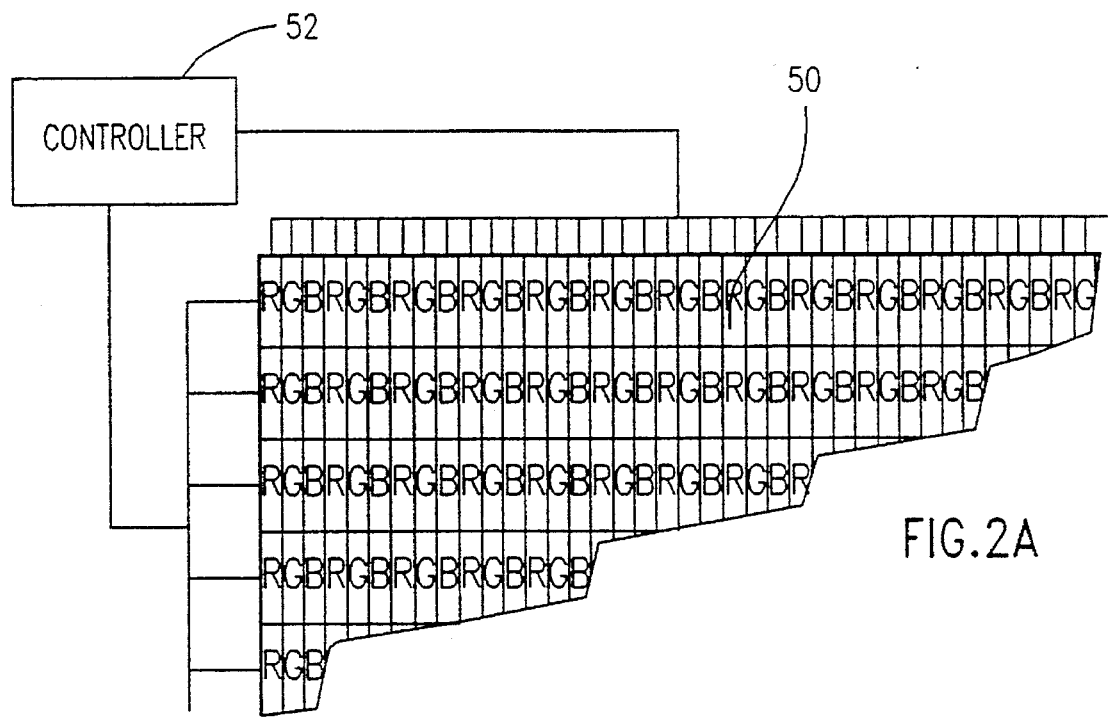
FIGS. 2A and 2B are simplified, schematic illustrations of two alternative examples of flat shutter assembly panels.

FIG. 2A illustrates in simplified schematic form an array 50 of interspersed filter pixels forming part of a shutter assembly panel such as assembly 18 (FIG. 1A) or assembly 38 (FIG. 1B). A controller 52 controls the opening or closing of the pixel light valves (not shown) which govern whether light is permitted to pass through each of the individual colored pixels of the assembly.

Figure 2B:
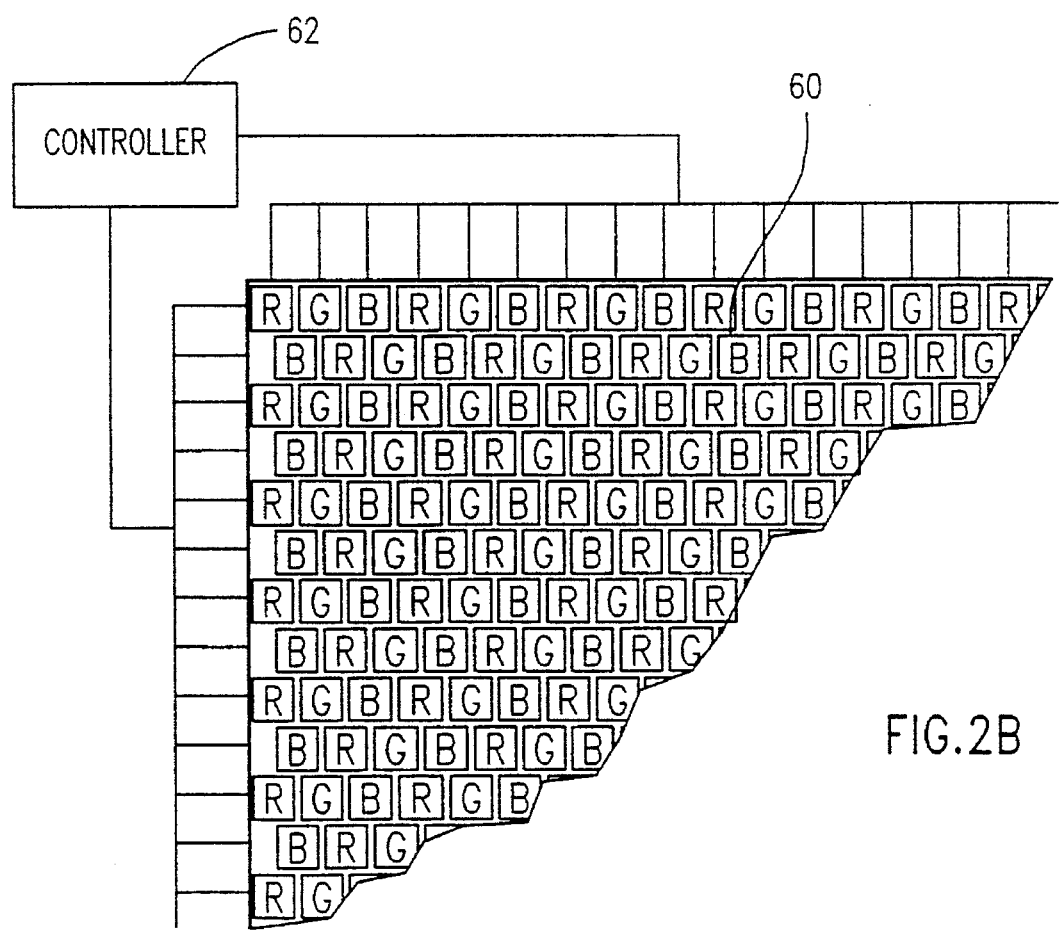

FIG. 2B illustrates another example of an array 60 of interspersed filter pixels forming part of a shutter assembly panel such as assembly 18 (FIG. 1A) or assembly 38 (FIG. 1B). A controller 62 controls the opening or closing of the pixel light valves (not shown) which govern whether light is permitted to pass through each of the individual colored pixels of the assembly.

Figure 3:
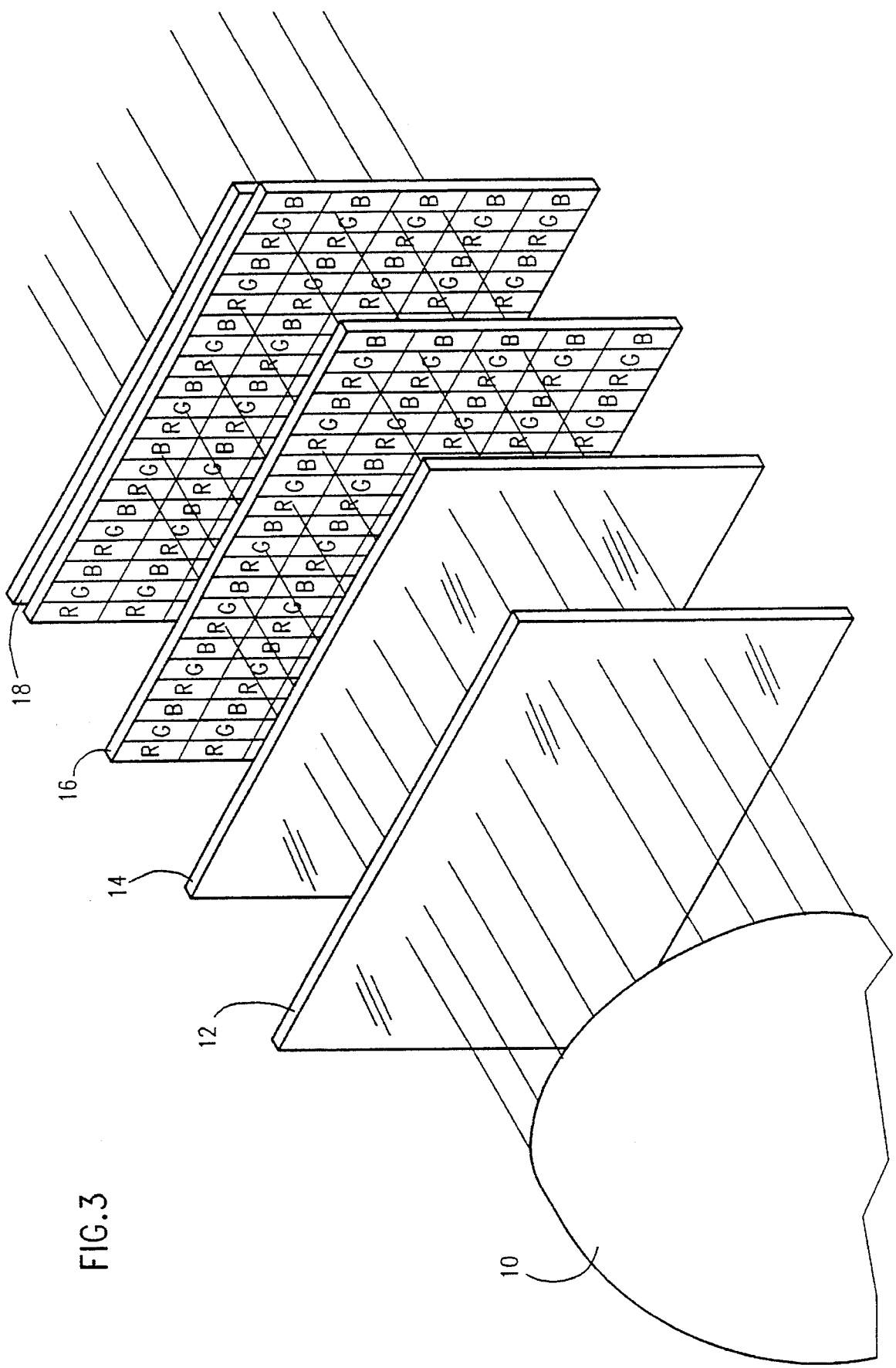
FIG. 3 is a simplified illustration of the spaced registration of a color filter and a shutter assembly panel in the embodiment of FIG. 1A.

FIG. 3 illustrates in greater detail the apparatus of the embodiment of FIG. 1A and shows the configuration of the color filter 16 which includes an array of interspersed filter pixels, each of which transmits only one of a plurality of colors, such as red, green and blue.

The one-to-one registration of the array of interspersed filter pixels of filter 16 and the array of interspersed shutter pixels of shutter assembly panel 18 is clearly shown.

The aforesaid color and light registration thus minimizes the absorption of light by the shutter assembly panel and enables relatively high intensity light sources to be employed without overheating and thus damaging the shutter assembly panel.

According to the present invention, only light of a given spectral content is allowed to impinge on a shutter area which transmits light of that spectral content.

Reference is now made to FIG. 25 which is similar to the embodiment of FIG. 3 except in that a polarizer is disposed in spaced relationship upstream of the shutter in order to absorb and dissipate heat which would otherwise impinge thereon.

Figure 4:
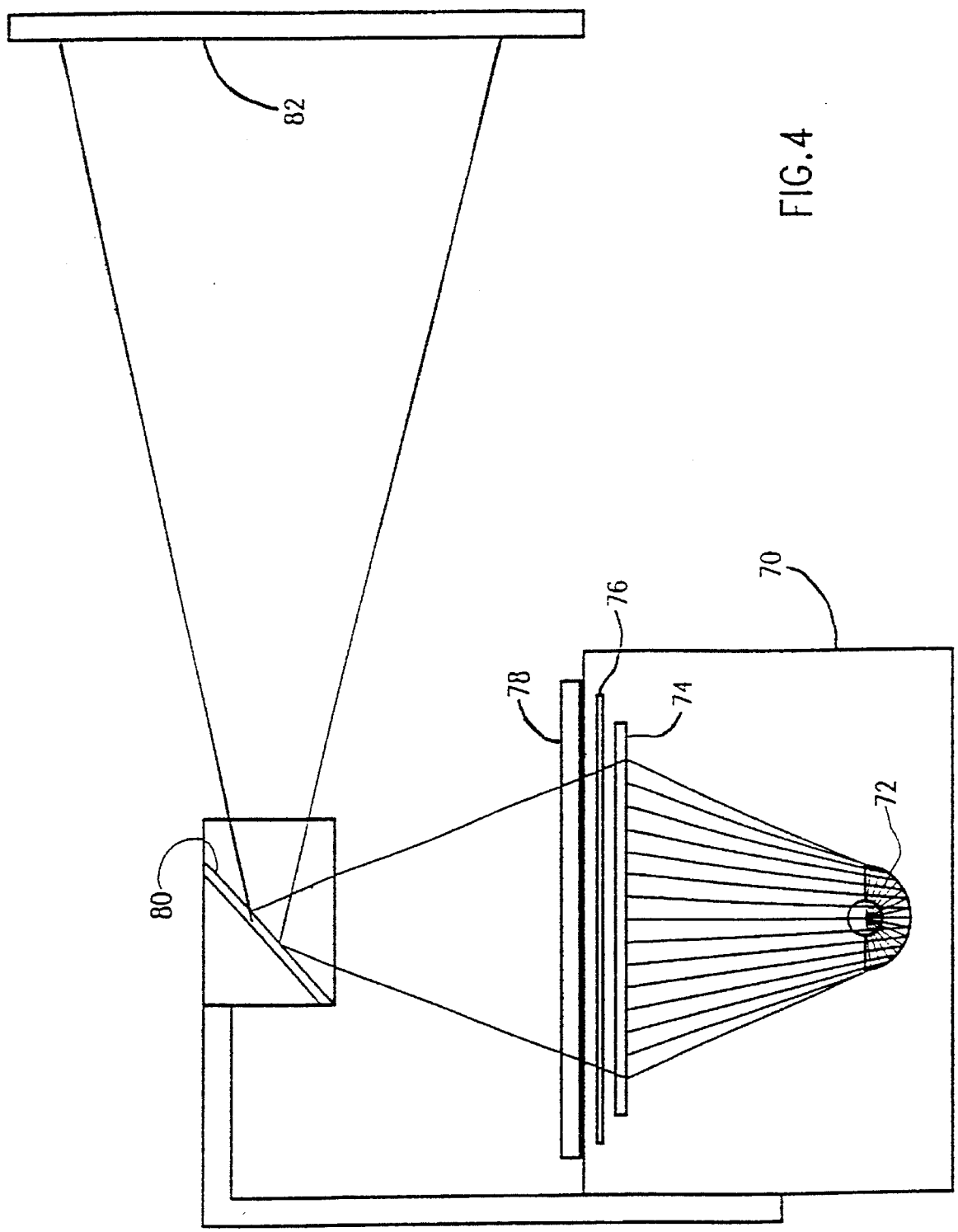
FIG. 4 is a simplified illustration of an overhead projector constructed and operative in accordance with a preferred embodiment of the present invention.

Reference is now made to FIG. 4, which illustrates an overhead projector constructed and operative in accordance with a preferred embodiment of the present invention. The overhead projector comprises a housing 70 in which is disposed a conventional, high intensity light source 72. Disposed in light receiving relationship with light source 72 is a Fresnel lens 74.

A polarizer 76 is disposed in spaced relationship above Fresnel lens 74 and a shutter assembly panel 78, which may be similar in all relevant respects to shutter assembly panel described above, is disposed in spaced relationship above polarizer 76. The shutter assembly panel 78 defines a selectable image which is reflected via a mirror 80 onto a screen or other suitable surface 82.

Figure 5:
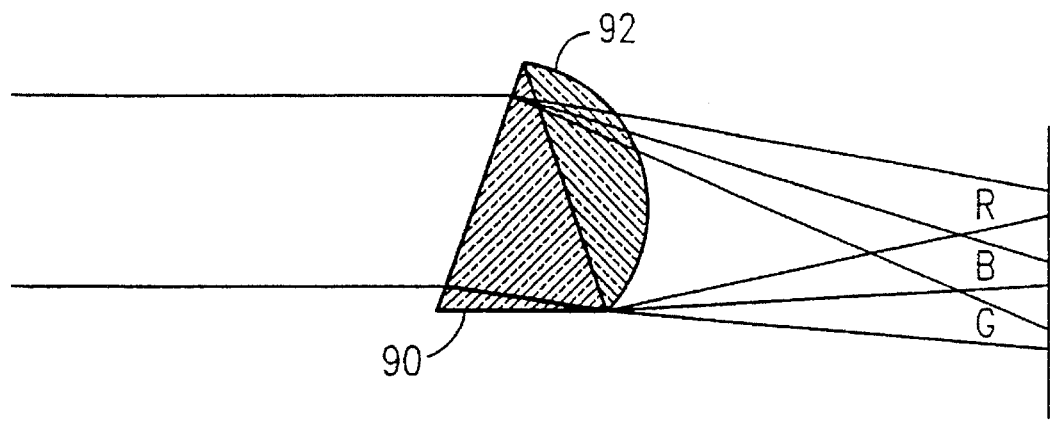
FIGS. 5 and 6 are simplified illustrations of the operation of a prism/lens combination and its application in an embodiment of the present invention.
Figure 6:
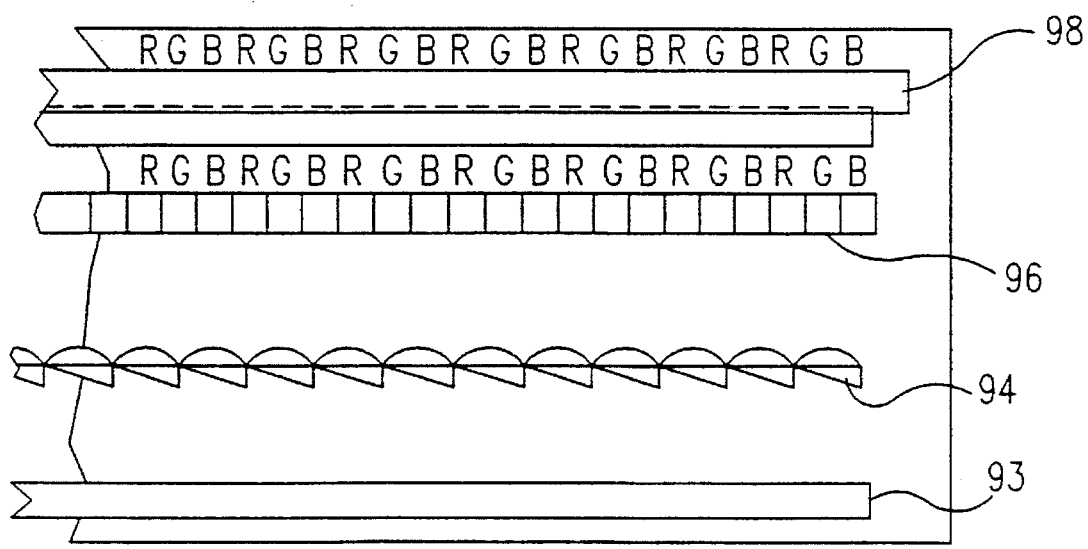

Reference is now made to FIGS. 5 and 6, which illustrate the use of a prism/lens combination to provide color separation of white light into R,G and B spectral portions. FIG. 5 shows an ordinary prism 90 associated with a cylindrical lens 92 receiving a collimated beam of white light and providing respective angled R,G and B beams. FIG. 5 indicates that this combination reduces the width of the R,G and B beams produced, in the illustrated embodiment, such that the total width of all of the beams is less than the width of the beam of white light impinging on the prism 90.

FIG. 6 illustrates an arrangement constructed and operative in accordance with a preferred embodiment of the present invention wherein light passes first through a polarizer 93 and thence through an array 94 of prism/cylindrical lens combinations, which break the light into individually colored beams, each of which then impinges on a suitably colored portion of a color filter 96 in registration therewith. The light beams passing through the individually colored portions of the color filter 96 impinge on portions of a shutter assembly panel 98, preferably an LCD, which are selected to correspond to the colored light impinging thereon.

Array 94 and filter 96 are preferably spaced from each other and from the polarizing plate 93.

It is appreciated that filter 96 and panel 98 may be attached together, such as in a commercially available color LCD panel. Alternatively, and preferably, a black and white LCD panel 98 may be employed and color filter 96 may be separate and spaced therefrom.

The structure of FIG. 6 is particularly suitable for use as a projector plate which can be employed with any suitable conventional overhead projector.

Figure 7:
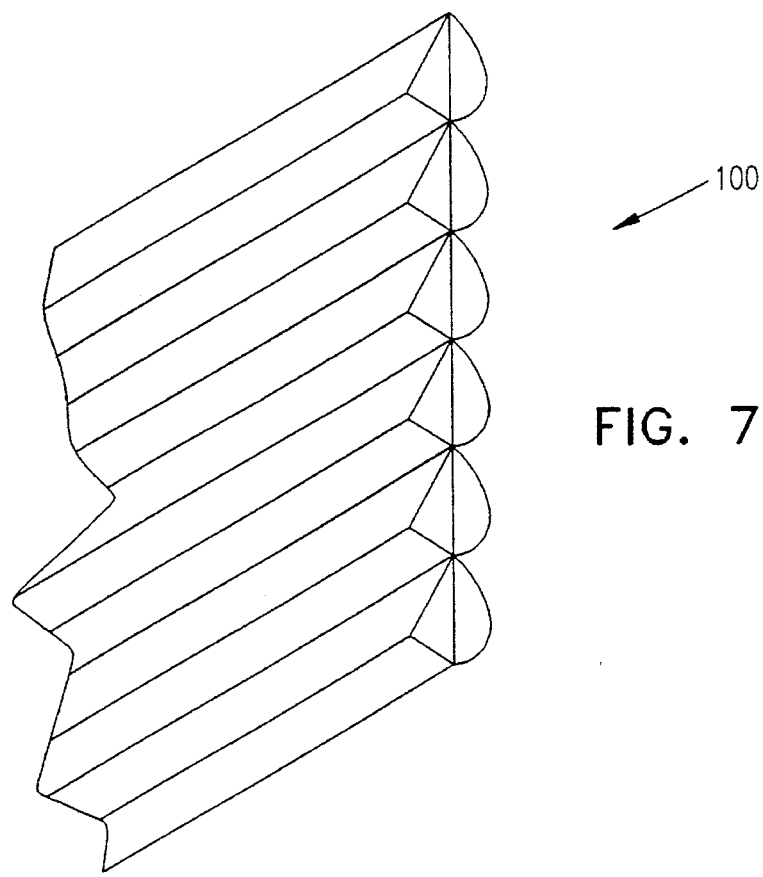
FIG. 7 is a pictorial illustration of a prism/lens combination array useful in the invention.
Figure 8:
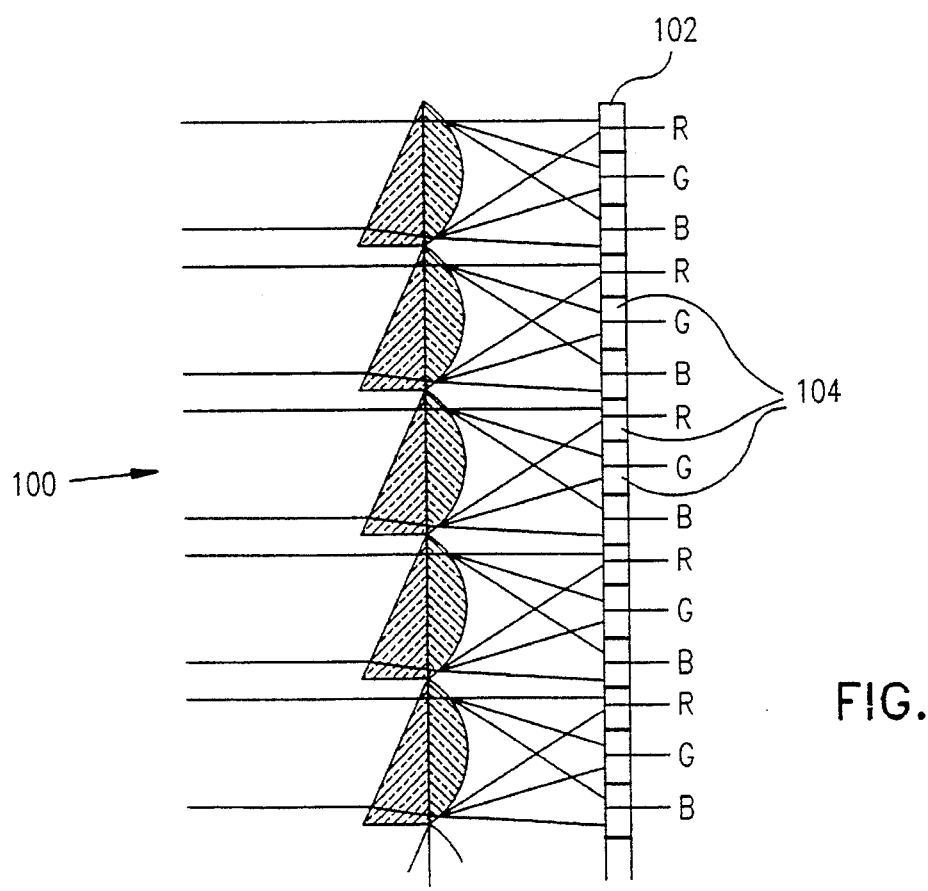
FIG. 8 is an illustration of the use of a prism/lens combination array of the type shown in FIG. 7 in a projector in accordance with a preferred embodiment of the present invention.

FIG. 7 is a pictorial illustration of an elongate prism/lens combination array 100 which is useful in the present invention, as shown in FIG. 6. FIG. 8 illustrates array 100 in combination with a shutter assembly panel 102, which may be similar to panel 18 or 98, described above. It is seen that each of the R, G and B spectral components is directed through a corresponding shutter pixel 104 of panel 102.

Figure 9:
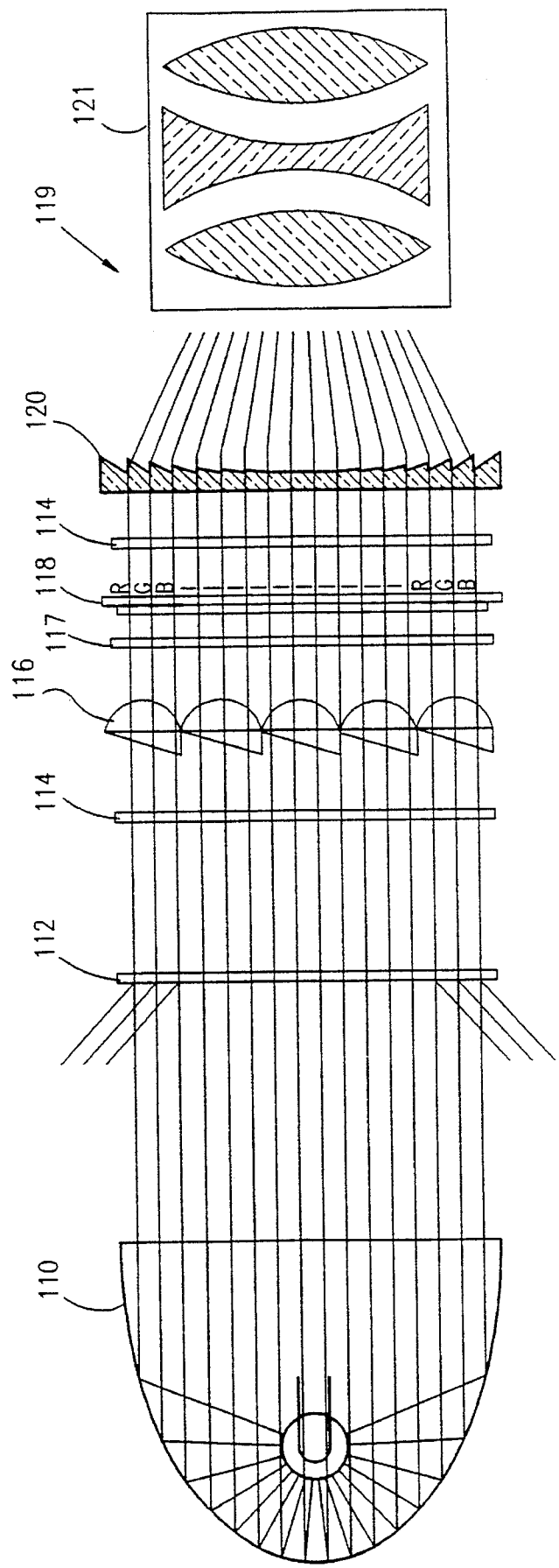
FIG. 9 is a simplified illustration of a projector of the type shown in FIG. 1A employing the prism/lens combination of FIG. 8.

Reference is now made to FIG. 9, which is a simplified illustration of a projector of the type shown in FIG. 24A employing the prism/lens combination of FIG. 8.

A collimated light source 110 of relatively high intensity, such as an arc lamp having a 1.2 Kilowatt rating provides a collimated beam of light which impinges on a transparent UV & IR blocking filter 112, and then preferably but optionally passes through a polarizing plate 114.

The collimated light beam then preferably passes through a prism/lens combination array 116, such as that shown in FIG. 7. The color separated beams produced by array 116 may then pass through a color filter 117, similar to color filter 16 (FIG. 1A) and defining a plurality of color transmissive pixels of different colors. Preferably, the color filter 117 comprises an array of interspersed filter pixels, each of which transmits only one of a plurality of colors, such as the primary colors, red, green and blue. Use of the color filter 117 is optional. When a liquid crystal shutter assembly panel is provided, a polarizer must be provided. The polarizer is preferably spaced from the shutter assembly panel as shown at reference numeral 114 in FIG. 9, but additionally or alternatively may form part of the shutter assembly panel 118.

The collimated light from the color filter 117 or directly from array 116 then impinges on a shutter assembly panel 118, such as a liquid crystal shutter assembly panel, spaced from the color filter 117, which preferably comprises a multiplicity of electrically controlled pixel light valves, employing either active or passive matrices, overlying an array of interspersed shutter pixels each of which transmits only one of a plurality of colors, such as the primary colors red, green and blue. Alternatively any other suitable type of shutter assembly panel may be employed.

In accordance with a preferred embodiment of the invention, the array of color separated light beams from array 116 is in light and color registration with the array of interspersed shutter pixels, such that generally light of a given color impinges on a shutter area of the same color.

In the embodiment of FIG. 9, where collimated light is used, the array of color separated light beams is in one-to-one registration with the array of interspersed shutter pixels.

Light modulated by the shutter assembly panel 118 may pass through a further polarizer 114, which may be identical to polarizer 114 upstream of panel 118, and is then focussed by a focusing lens assembly 119 downstream thereof or at any other suitable location. Focusing lens assembly 119 preferably includes a Fresnel lens 120 and a compound lens 121.

Figure 10:
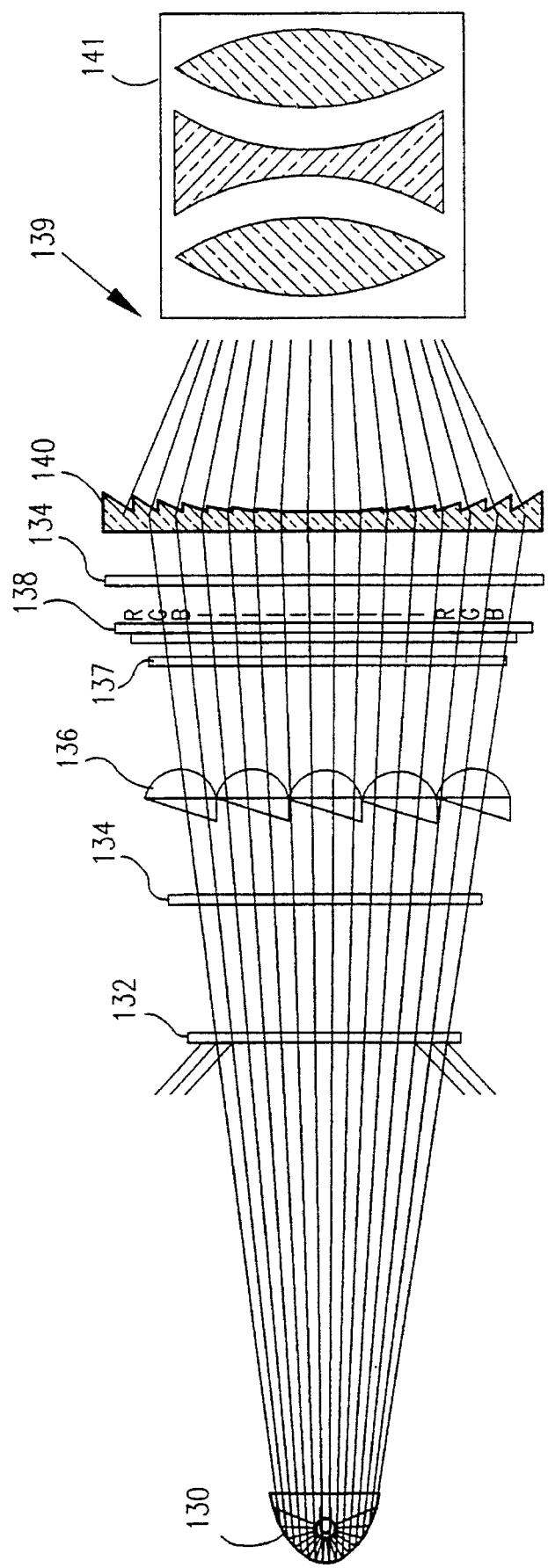
FIG. 10 is a simplified illustration of a projector of the type shown in FIG. 1B employing the prism/lens combination of FIG. 8.

Reference is now made to FIG. 10, which is a simplified illustration of a projector of the type shown in FIG. 24B employing the prism/lens combination of FIG. 8.

A non-collimated light source 130 of relatively high intensity provides a non-collimated beam of light which impinges on a transparent UV & IR blocking filter 132 and then preferably but optionally passes through a polarizing plate 134.

The non-collimated light beam preferably then passes through a prism/lens combination array 136, such as that shown in FIG. 7. The color separated beams produced by array 136 may then pass through a color filter 137, similar to color filter 16 (FIG. 1b) and defining a plurality of color transmissive pixels of different colors. Preferably, the color filter 137 comprises an array of interspersed filter pixels, each of which transmits only one of a plurality of colors, such as the primary colors, red, green and blue. Use of the color filter 137 is optional.

Array 136 and filter 137 are preferably spaced from each other and the polarizing plate 134 and have a multiplicity of color transmissive pixels, of different colors.

The non-collimated light from the color filter 137 or directly from array 136 then impinges on a shutter assembly panel 138, such as a liquid crystal shutter assembly panel, spaced from the color filter 137 and array 136 and which preferably comprises a multiplicity of electrically controlled pixel light valves overlying an array of interspersed shutter pixels each of which transmits only one of a plurality of colors, such as the primary colors red, green and blue.

In accordance with a preferred embodiment of the invention, the array of color separated light beams from array 136 is in light and color registration with the array of interspersed shutter pixels, such that generally light of a given color impinges on a shutter area of the same color.

In the embodiment of FIG. 10, where non-collimated light is used, the array of color separated light beams is not in one-to-one registration with the array of interspersed shutter pixels.

Light modulated by the shutter assembly panel 138, and passing through another polarizer plate 134, identical to the polarizer plate 134 upstream of separator 136, is focussed by a lens assembly 139 downstream thereof or at any other suitable location. Preferably, lens assembly 139 includes a Fresnel lens 140 and a compound lens 141.

Figure 11A:
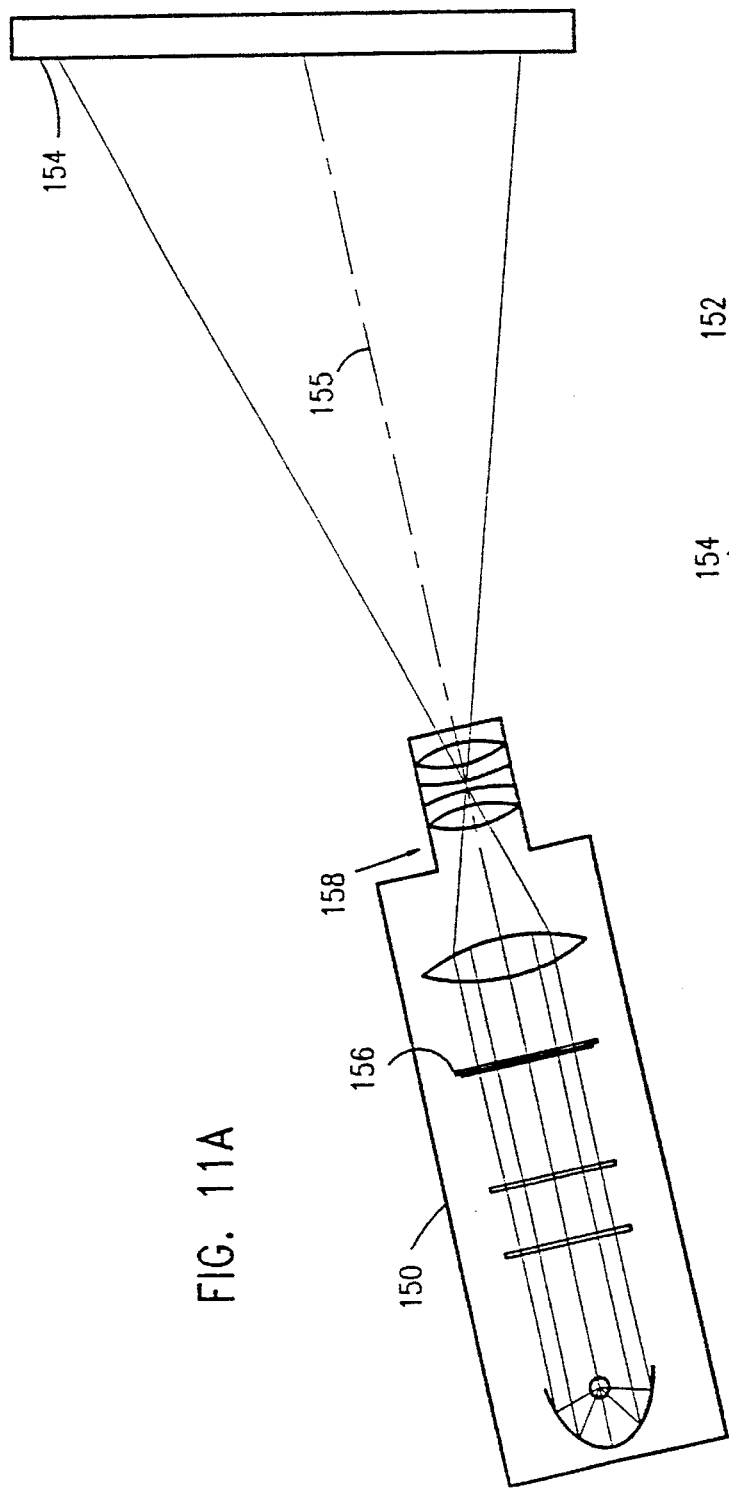
FIGS. 11A and 11B are respectively a simplified illustration of a projector and an illustration of an image projected thereby.
Figure 11B:
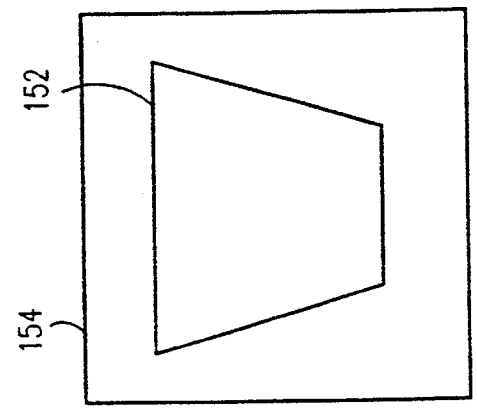

Reference is now made to FIGS. 11A and 11B which are respectively a simplified illustration of a projector 150 and an illustration of an image 152 projected thereby onto a screen 154 or other surface. The projector may be a projector constructed and operative in accordance with any of the above-described embodiments, particularly that of FIG. 24A. The projected image 152 is seen to have a trapezoidal shape due to the non-perpendicular angle between the optical axis 155 of the projector 150 and the screen 154.

Reference is now made to FIGS. 12A, 12B and 12C, which are respectively a simplified illustration of a projector 160, an illustration of the image 162 produced thereby as seen along arrow B and an illustration of an image 164 projected thereby as seen along arrow C.

It is seen that whereas in the projector 150 of FIG. 11A, the shutter assembly panel 156 and focussing lens 158 are generally parallel, in the projector 160, the corresponding shutter assembly panel 166 and focussing lens assembly 167, including Fresnel lens 168 and a compound lens 169, are tilted towards each other. This creates a distortion in the image 162 which is opposite to the distortion produced by the non-perpendicular angular relationship between the optical axis 165 of projector 160 and the screen 170. The result is a desired rectangular projected image 164.

Figure 13:
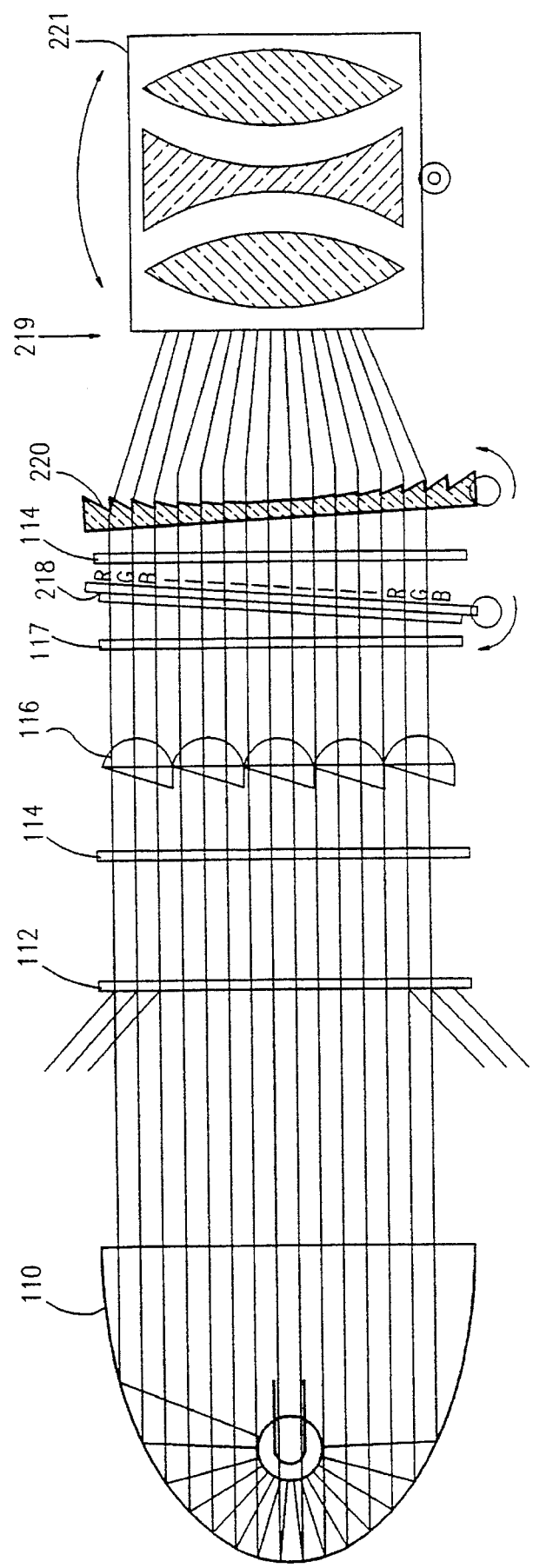
FIG. 13 is a simplified illustration of a projector of the type shown in FIG. 9 employing the prism/lens combination of FIG. 8 and employing tiltable optical components.

Reference is now made to FIG. 13, which is a simplified illustration of a projector of the type shown in FIG. 9 employing the prism/lens combination of FIG. 8 and employing tiltable optical components. The optical components may be identical to those shown in FIG. 9. Here, however, the shutter assembly panel 218 and the focusing lens assembly 219 including Fresnel lens 220 and compound lens 221 are tiltably mounted by any suitable mounting mechanism, so as to enable a selected distortion to be provided to the image produced thereby. This selected distortion is chosen to be identical but opposite to the distortion resulting from arrangement of the projector such that its optical axis is non-perpendicular with respect to a screen or other projection surface. It is appreciated that either or both of lenses 220 and 221 may be tilted as appropriate.

Figure 15:
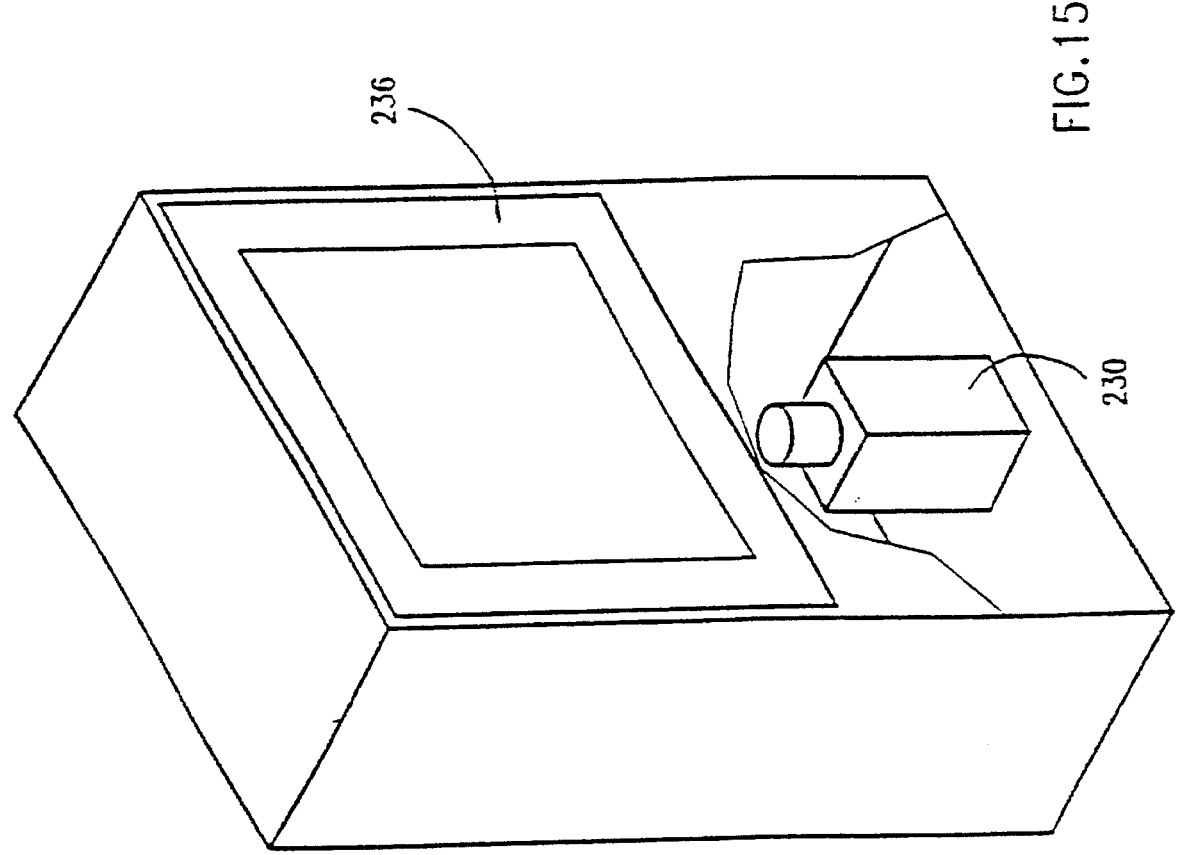
FIGS. 14 and 15 are respective simplified schematic and partially cut away pictorial illustrations of a projection system constructed and operative in accordance with a preferred embodiment of the present invention.
Figure 14:
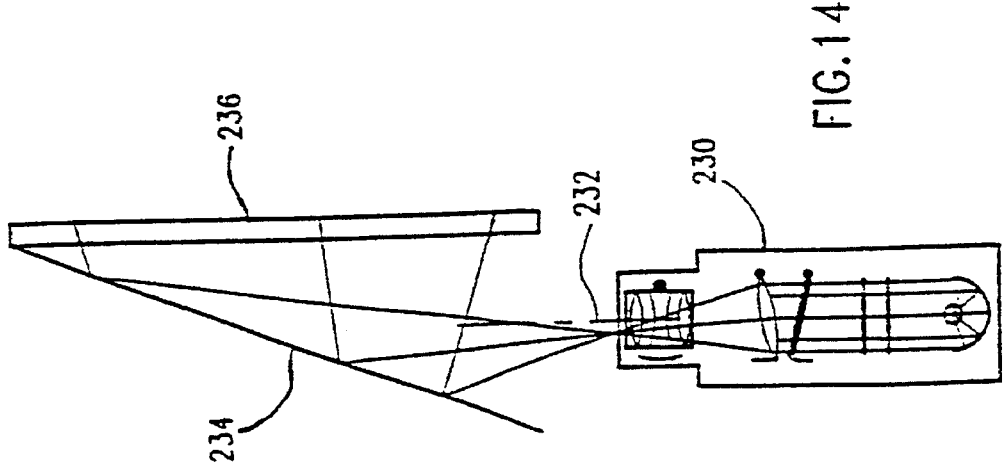

Reference is now made to FIGS. 14 and 15, which are respective simplified schematic and partially cut away pictorial illustrations of a projection system constructed and operative in accordance with a preferred embodiment of the present invention. Here a projector 230 is arranged with its optical axis 232 at a non-perpendicular angle with respect to a mirror 234 which directs the image projected by the projector 230 onto a screen 236. Preferably, the projector 230 is of the type illustrated in FIG. 13 and described hereinabove.

Figure 16:
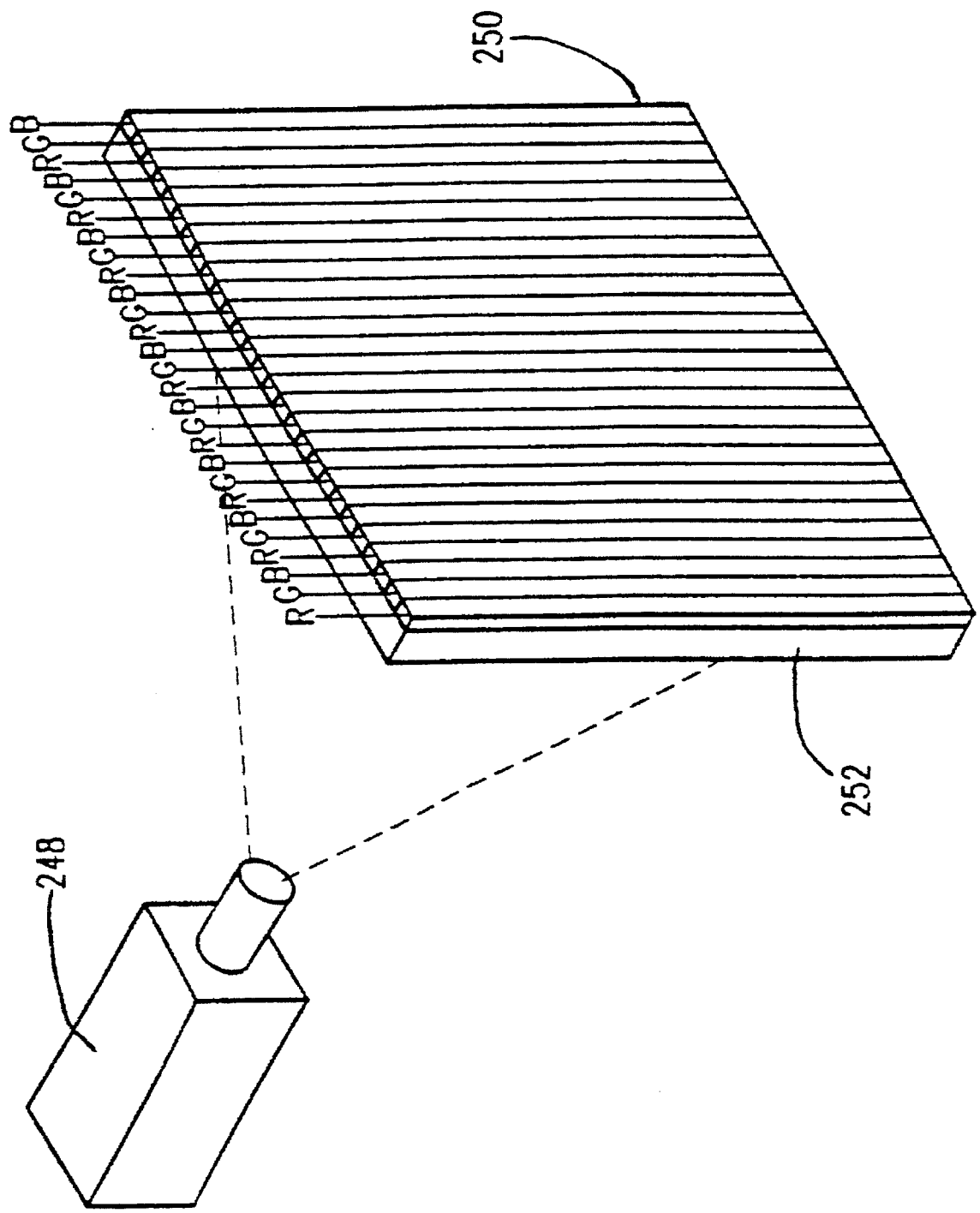
FIGS. 16 and 17 are simplified schematic illustrations of front and rear projection systems employing a filtered screen and a projector constructed and operative in accordance with a preferred embodiment of the present invention.
Figure 17:
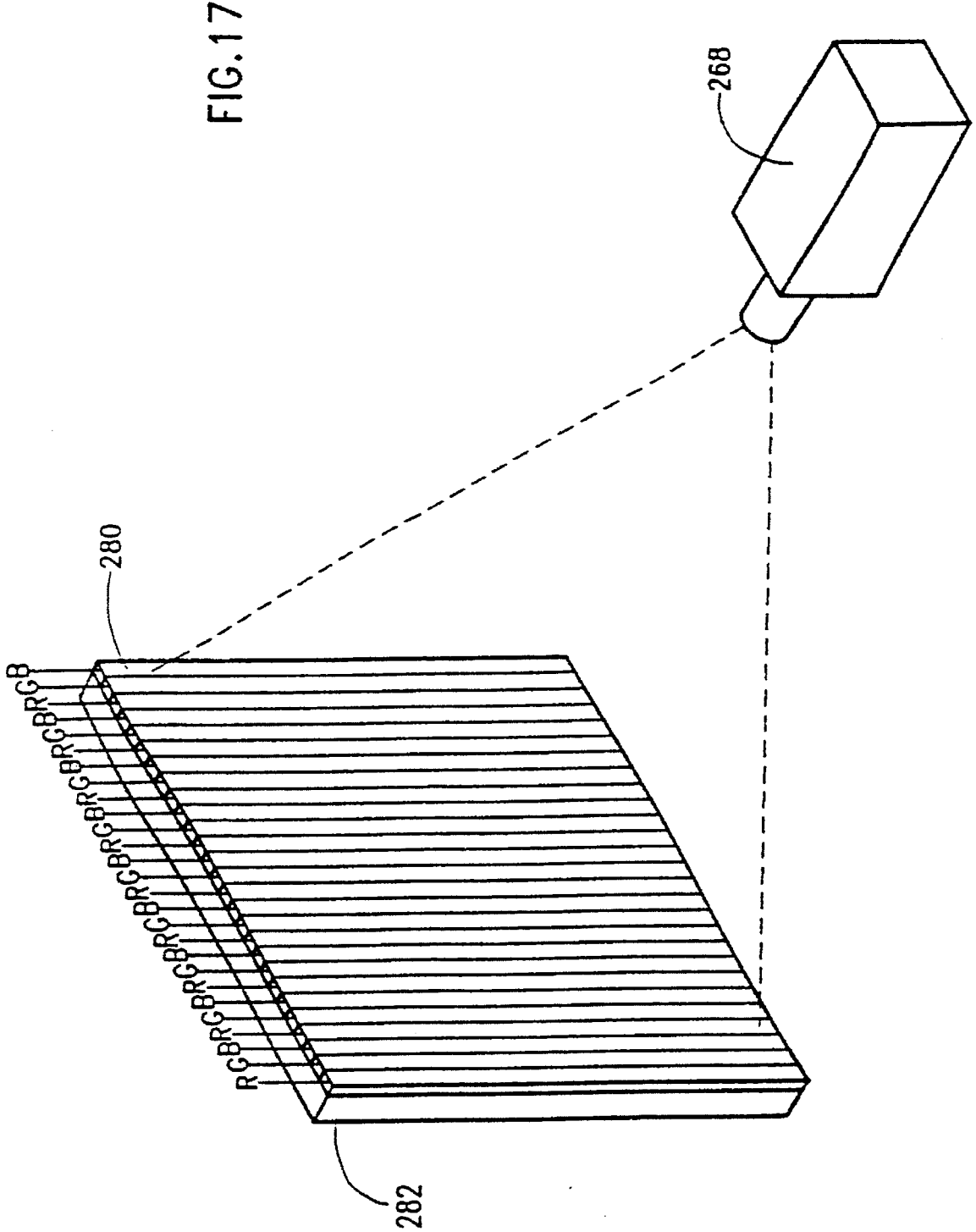

Reference is now made to FIGS. 16 and 17, which are simplified schematic illustrations of front and rear projection systems employing a filtered screen and a projector constructed and operative in accordance with a preferred embodiment of the present invention.

In the embodiment of FIG. 16, the projector 248 may be a projector according to any of the embodiments of the invention described hereinabove other than that of FIG. 2B, and the resulting colored light beams are spatially aligned with an array 250 of colored filter strips associated with a projection screen 252, such that each color separation beam falls on a filter strip of generally the same color. It is assumed that the number and size of the strips making up array 250 may be such that the individual strips cannot be discerned by the unaided human eye from a normal viewing distance.

FIG. 16 illustrates a rear projection system, while FIG. 17 illustrates the equivalent front projection system, employing a projector 268, an array 280 and an associated screen 282.

The projection systems illustrated in FIGS. 16 and 17 have been found to demonstrate greatly enhanced contrast, clarity and brightness as compared with conventional projection systems.

Reference is now made to FIG. 18, which illustrates a projection screen constructed and operative in accordance with a preferred embodiment of the present invention. The projection screen comprises any suitable pattern, such as strips 300, of transparent material in the three basic colors. Preferably the maximum width of the strip or other pattern is less than the resolution limit of the human eye during normal viewing.

The projection screen of FIG. 18 can be used with any rear projection system wherein a light transmissive screen is required and wherein light of different colors impinges at different locations on the screen. It is not limited in applicability to use with a projector of the type described hereinabove in connection with any of FIGS. 1–17 and 24A–25. It has the effect of significantly increasing the contrast of the displayed image with respect to the ambient, but does reduce brightness of the displayed image. The screen of FIG. 18 may also be used for front projection, when a reflective or emissive substrate is disposed therebehind.

Figure 20:
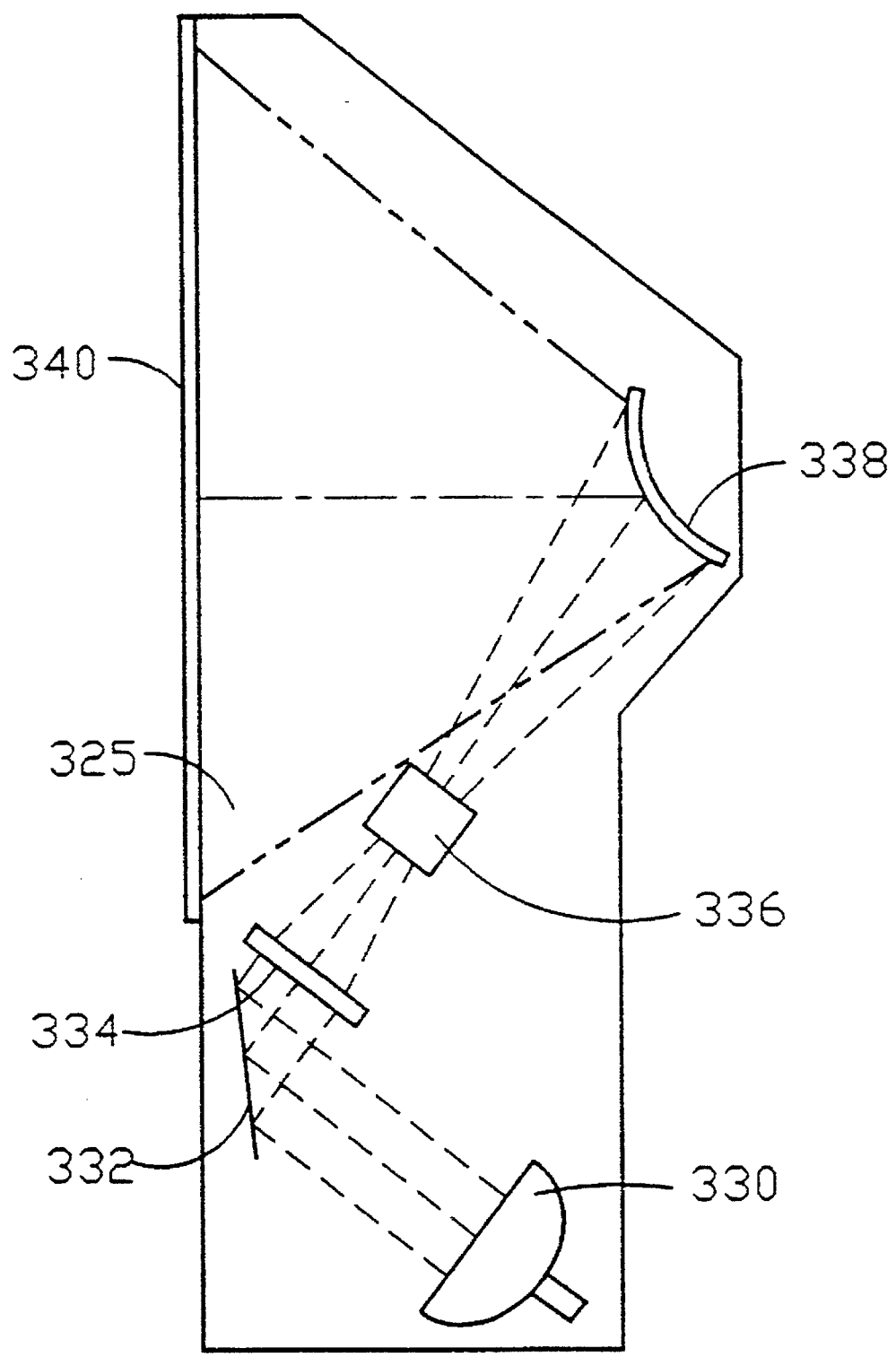

Reference is now made to FIGS. 19 and 20, which are simplified illustrations of two versions of a rear projection television system constructed and operative in accordance with a preferred embodiment of the present invention.

Whereas prior art rear projection television systems involve severe limitations on ability to reduce the depth thereof, the present invention overcomes this limitation by using optics having optical power in place of a conventional flat folding mirror just before the screen.

In the embodiment of FIG. 19, there is provided a projector 305, which may be any suitable projector and is preferably a projector of the type described hereinabove in connection with any of FIGS. 1–17 and 24A–25. The projector 305 typically receives a generally collimated beam of light from a light source 310, typically via a folding mirror 312 and typically includes a filter and shutter assembly 314.

Modulated light from filter and shutter assembly 314 is supplied via an objective lens 316 and a folding mirror 318 to a diverging lens 320 which projects the light modulated by the filter and shutter assembly 314 onto a screen 322, which can be any suitable screen, producing a real image at the screen.

In the embodiment of FIG. 20, there is provided a projector 325, which may be any suitable projector and is preferably a projector of the type described hereinabove in connection with any of FIGS. 1–17 and 24A–25. The projector 325 typically receives a generally collimated beam of light from a light source 330, typically via a folding mirror 332 and typically includes a filter and shutter assembly 334.

Modulated light from filter and shutter assembly 334 is supplied via an objective lens 336 to a diverging mirror 338 which projects the light modulated by filter and shutter assembly 334 onto a screen 340, which can be any suitable screen, producing a real image on the screen.

In order to correct optical distortions, the diverging optics employed in the apparatus of FIGS. 19 and 20 should include aspheric elements or other means of correction. The use of lens 320 adds additional chromatic distortions, which are a disadvantage in comparison with the preferred version, shown in FIG. 20.

Figure 21:
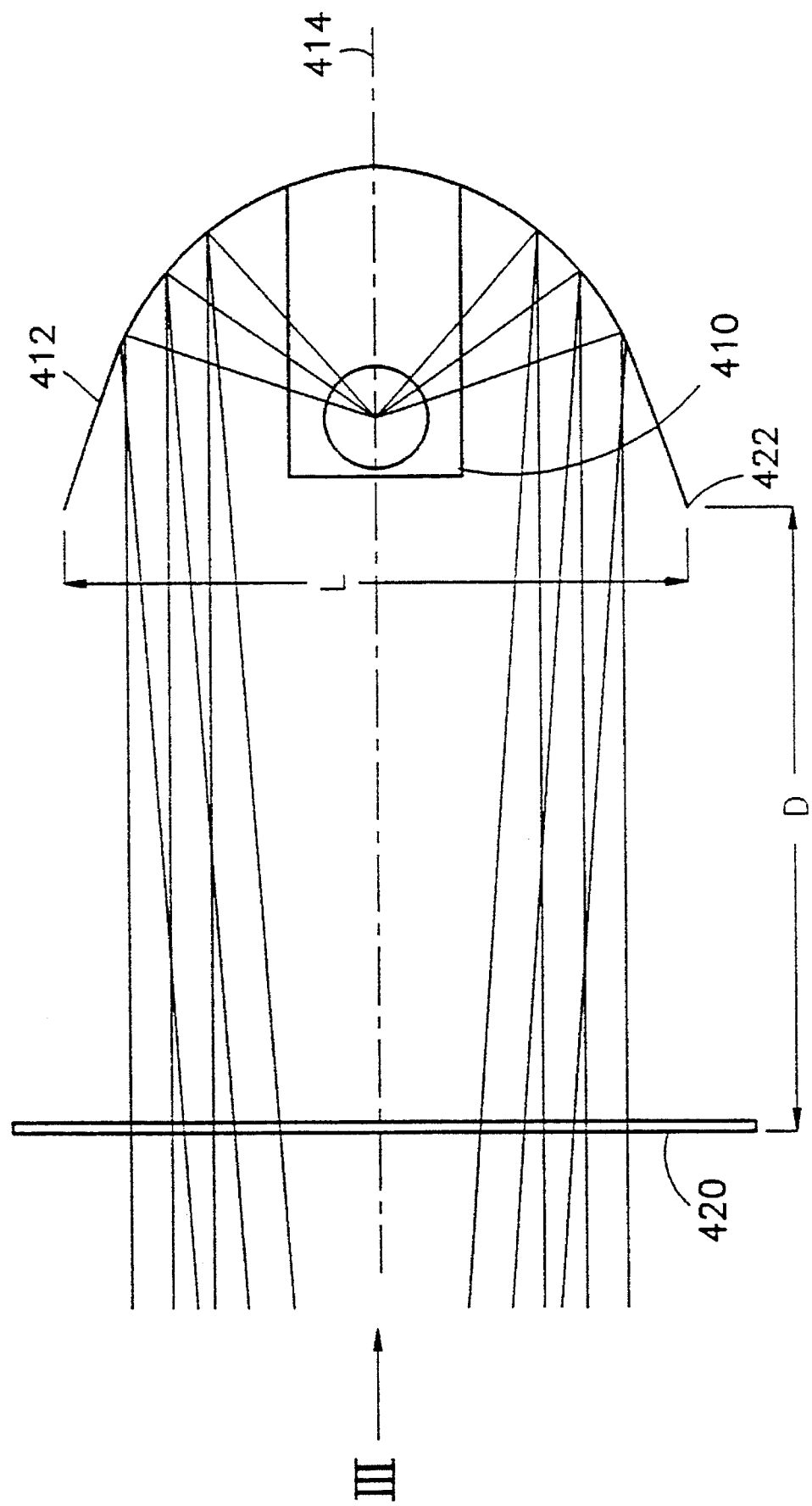
FIG. 21 is a simplified side view sectional illustration of a projection system constructed and operative in accordance with a further preferred embodiment of the present invention.
Figure 22:
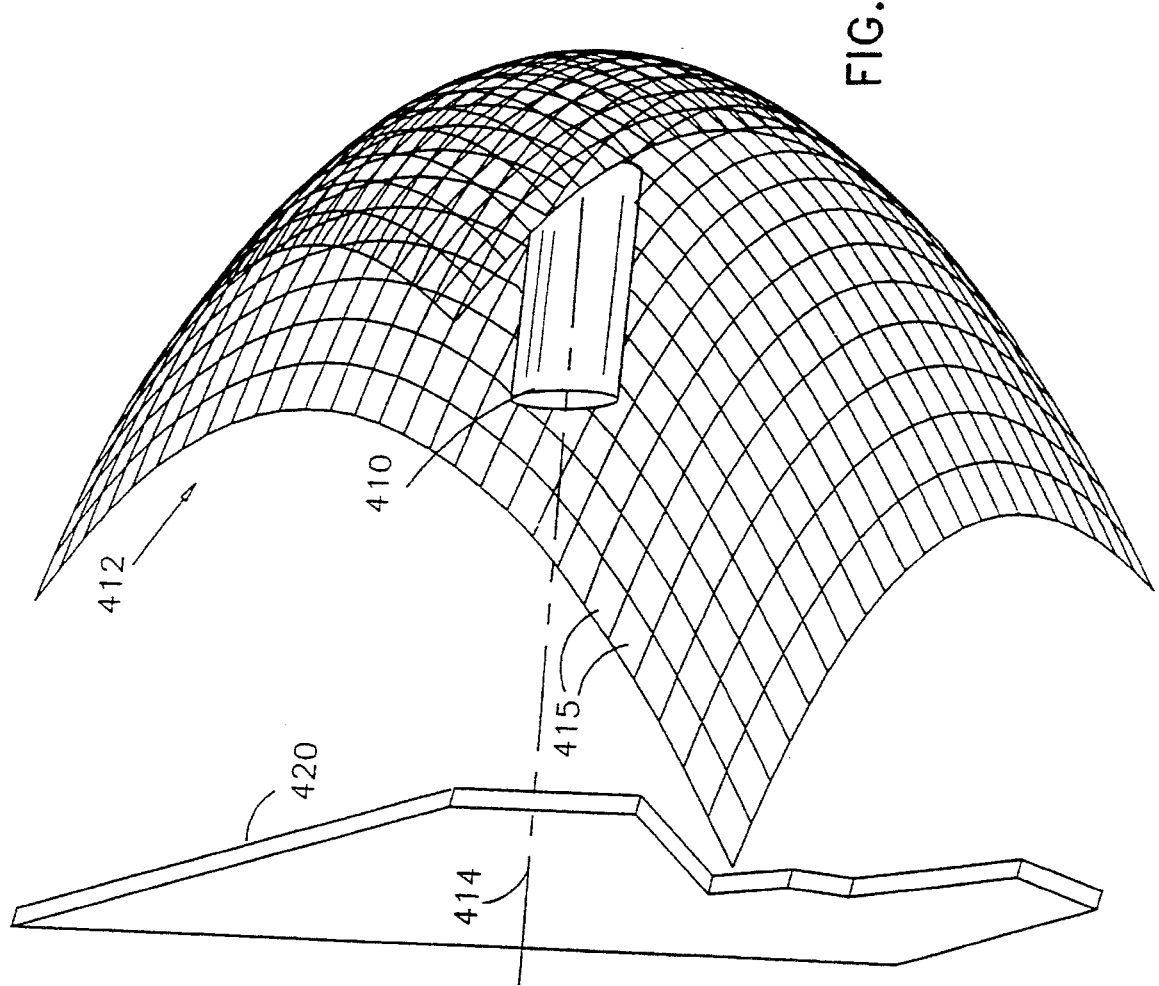
FIG. 22 is computer generated, simplified pictorial illustration of a preferred embodiment useful in the projection system of FIG. 21.
Figure 23:
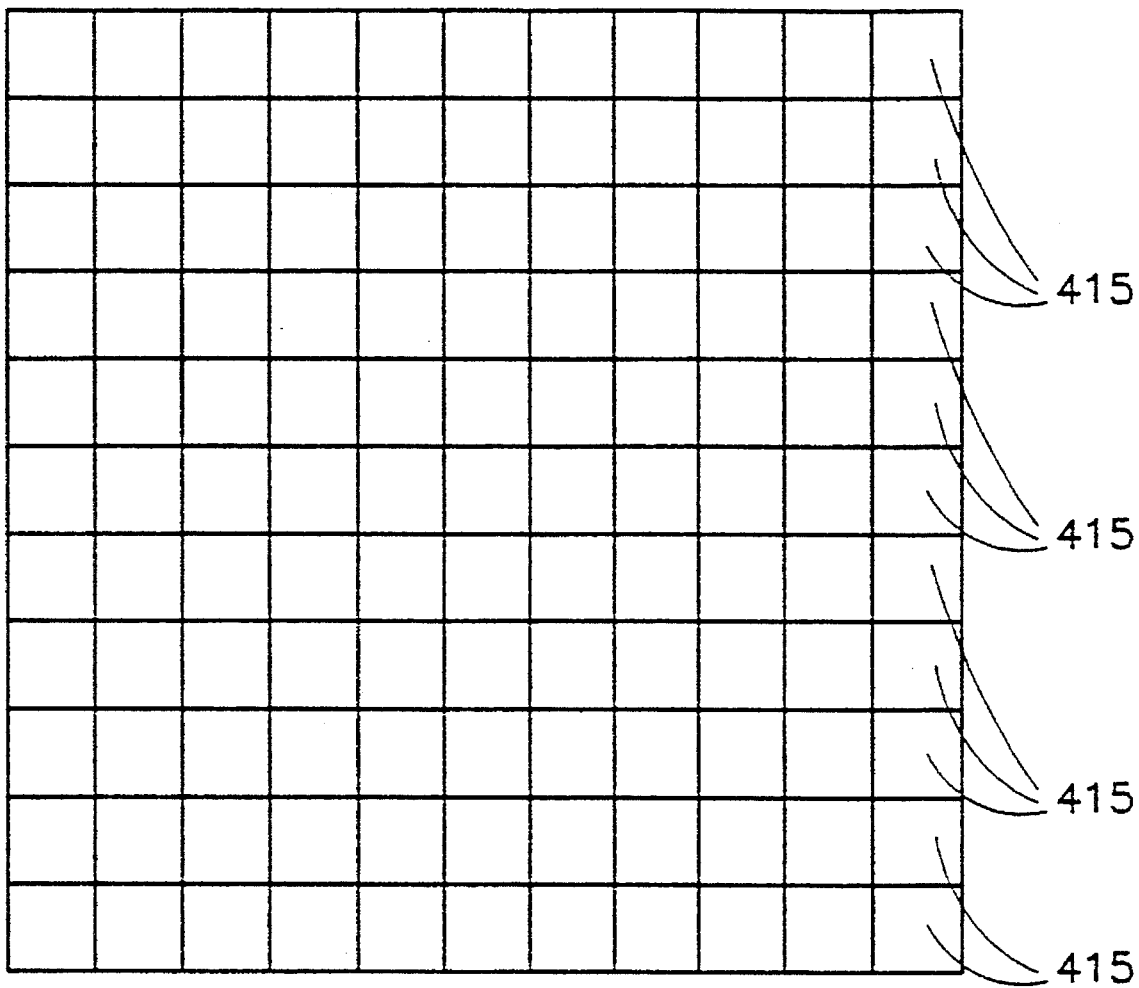
FIG. 23 is an illustration of how a portion of the reflector of FIG. 22 is seen when viewed along the optical axis of the projection apparatus of FIG. 21.

Reference is now made to FIGS. 21–23, which illustrate a projection system constructed and operative in accordance with a preferred embodiment of the present invention. The projection system comprises a light source 410, preferably a high intensity incandescent light source such as a halogen lamp. Preferably the light source is a metal Halide arc lamp, such as a Philips MSR series lamp. The light source 410 is at least partially surrounded by a concave reflector 412 which is constructed and operative in accordance with a preferred embodiment of the present invention.

Concave reflector 412 may be made of any suitable substrate such as metal, glass and plastic and may have a reflective surface made of any suitable material such as metal or one or more dielectric coating layers, and is preferably symmetrical about a reflector axis 414. In accordance with a preferred embodiment of the present invention, the reflector is characterized in being formed of a multiplicity of flat reflector surface units 415, the multiplicity of flat surface units being configured and arranged such that the projection of each of the multiplicity of flat surface units onto a plane perpendicular to the axis is generally identical, as illustrated in FIG. 23.

It may be appreciated from a consideration of FIG. 22, that the two dimensional and three-dimensional configuration of each of the reflector surface units 415 varies as a function of its distance from axis 414 along the reflector surface.

It is a particular feature of the present invention that the reflector is operative to reflect onto every location within a projection region in a projection plane extending perpendicular to axis 414 in front of the reflector, light from various locations on the light source, so as to produce a generally homogeneous, non-imagewise reflection from the light source to the projection plane.

In accordance with a preferred embodiment of the present invention a light transmissive object 420, such as a liquid crystal transparency panel or film transparency to be projected is located in a projection plane which is relatively close to the light source and to the reflector. Preferably, the distance D of the object 420 from the facing edge 422 of the reflecting surface 412 parallel to axis 414 is approximately equal to the largest dimension L of the opening of the reflecting surface 412 at the facing edge 422.

The present invention is particularly useful for compact-wide screen projection apparatus, such as projection television, where the depth of the unit is sought to be minimized.

It will be appreciated by persons skilled in the art that the present invention is not limited by what has been particularly shown and described hereinabove. Rather the scope of the present invention is intended to include also modifications and variations within the scope of the claims which follow:

I claim:

1. A radiation reflector for providing generally homogeneous illumination in a plane perpendicular to an axis, the reflector comprising a generally curved reflecting surface formed of a multiplicity of flat surface units, the multiplicity of flat surface units being configured and arranged such that the projection of each of said multiplicity of flat surface units onto a plane perpendicular to said axis is generally identical.

2. Apparatus according to claim 1 and wherein said generally curved reflecting surface comprises a concave surface.

3. Apparatus according to claim 1 and wherein said generally curved reflecting surface comprises a surface of revolution.

4. Apparatus according to claim 1 and wherein said generally curved reflecting surface comprises a generally parabolic surface.

5. Apparatus according to claim 1 and wherein said generally homogeneous illumination is directed generally along said axis.

6. A compact projection system comprising:

a non-homogeneous radiation source;

a radiation reflector for providing generally homogeneous non-imagewise illumination in a plane perpendicular to an axis, the reflector comprising a generally curved reflecting surface receiving radiation from said non-homogeneous radiation source, said reflecting surface having a facing edge and being formed of a multiplicity of flat surface units, the multiplicity of flat surface units being configured and arranged such that the projection of each of said multiplicity of said flat surface units onto a plane perpendicular to said axis is generally identical, said radiation reflector being arranged to illuminate a light transmissive object in said plane;

lens apparatus for receiving radiation passing through said light transmissive object and focusing said radiation to form an image; and a screen for receiving said focused radiation.

7. Apparatus according to claim 6 and wherein said generally curved reflecting surface comprises a concave surface.

8. Apparatus according to claim 6 and wherein said generally curved reflecting surface comprises a surface of revolution.

9. Apparatus according to claim 6 and wherein said generally curved reflecting surface comprises a generally parabolic surface.

10. Apparatus according to claim 6 and wherein said light transmissive object is located at a distance from the facing edge of the reflecting surface along the axis which is approximately equal to the largest dimension of the opening of the reflecting surface at the facing edge.

11. Apparatus according to claim 6 and wherein said generally homogeneous non-imagewise illumination is directed generally along said axis.

\* \* \* \* \*